US 8,085,050 B2

(12) United States Patent
Bittar et al.

(10) Patent No.: US 8,085,050 B2
(45) Date of Patent: Dec. 27, 2011

(54) ROBUST INVERSION SYSTEMS AND METHODS FOR AZIMUTHALLY SENSITIVE RESISTIVITY LOGGING TOOLS

(75) Inventors: Michael S. Bittar, Houston, TX (US); Guoyu Hu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/299,760

(22) PCT Filed: Mar. 16, 2007

(86) PCT No.: PCT/US2007/064221
§ 371 (c)(1),
(2), (4) Date: Nov. 5, 2008

(87) PCT Pub. No.: WO2008/115229
PCT Pub. Date: Sep. 25, 2008

(65) Prior Publication Data
US 2010/0156424 A1 Jun. 24, 2010

(51) Int. Cl.
*G01V 3/10* (2006.01)
(52) U.S. Cl. .................. 324/339; 324/323; 324/332
(58) Field of Classification Search .................. None
See application file for complete search history.

(56) References Cited

U.S. PATENT DOCUMENTS

| 2,901,689 A | 8/1959 | Barrett |
| 3,014,177 A | 12/1961 | Hungerford et al. |
| 3,187,252 A | 6/1965 | Hungerford |
| 3,286,163 A | 11/1966 | Holser et al. |
| 3,412,815 A | 11/1968 | Holser |
| 3,510,757 A | 5/1970 | Huston |
| 3,539,911 A | 11/1970 | Youmans et al. |
| 3,561,007 A | 2/1971 | Gouilloud et al. |
| 3,808,520 A | 4/1974 | Runge |
| 3,982,176 A | 9/1976 | Meador |
| 4,302,722 A | 11/1981 | Gianzero |

(Continued)

FOREIGN PATENT DOCUMENTS

EP 0527089 2/1993

(Continued)

OTHER PUBLICATIONS

"Advisory Action", dated Apr. 13, 2007, U.S. Appl. No. 11/457,709, "Electromagnetic Wave Resistivity Tool Having a Tilted Antenna for Geosteering Within a Desired Payzone", filed Jul. 14, 2006.

(Continued)

*Primary Examiner* — Roberto Velez
*Assistant Examiner* — Trung Nguyen
(74) *Attorney, Agent, or Firm* — Krueger Iselin LLP

(57) ABSTRACT

Methods and systems for determining the horizontal resistivity, vertical resistivity, and relative dip angle of anisotropic earth formations. Some of the disclosed methods and systems measure sinusoidal variation of azimuthally sensitive resistivity logging tool measurements, determine parameters representative of the sinusoidal variation, and perform inversion based on the sinusoidal parameters. When cast in this manner, the inversion process may yield more accurate and consistent resistivity and dip angle estimates. The sinusoidal parameters preferably take the form of average and peak-to-peak measurements, but may also take other forms. Moreover, use of such sinusoidal parameters enables a condensed representation of the resistivity logging tool measurements, enabling significantly more efficient communication and storage of these measurements. The condensed representations continue to enable directional boundary detection and geosteering.

20 Claims, 14 Drawing Sheets

U.S. PATENT DOCUMENTS

| | | |
|---|---|---|
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,610,313 A | 9/1986 | Daly et al. |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| RE32,913 E | 4/1989 | Clark |
| 4,845,433 A | 7/1989 | Kleinberg |
| 4,873,488 A | 10/1989 | Barber et al. |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,962,490 A | 10/1990 | Lyle et al. |
| 4,980,643 A | 12/1990 | Gianzero et al. |
| 5,089,779 A | 2/1992 | Rorden |
| 5,115,198 A | 5/1992 | Gianzero et al. |
| 5,160,925 A | 11/1992 | Dailey et al. |
| 5,200,705 A | 4/1993 | Clark et al. |
| 5,210,495 A | 5/1993 | Hapashey et al. |
| 5,230,386 A | 7/1993 | Wu et al. |
| 5,239,448 A | 8/1993 | Perkins et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,343,152 A | 8/1994 | Kuckes |
| 5,389,881 A | 2/1995 | Bittar et al. |
| 5,402,068 A | 3/1995 | Meador et al. |
| 5,424,293 A | 6/1995 | Sinclair et al. |
| 5,428,293 A | 6/1995 | Sinclair et al. |
| 5,442,294 A | 8/1995 | Rorden |
| 5,448,227 A | 9/1995 | Orban et al. |
| 5,475,309 A | 12/1995 | Hong et al. |
| 5,485,089 A | 1/1996 | Kuckes |
| 5,501,285 A | 3/1996 | Lamine et al. |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,589,775 A | 12/1996 | Kuckes |
| 5,594,343 A | 1/1997 | Clark et al. |
| 5,602,541 A | 2/1997 | Comeau et al. |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,813,480 A | 9/1998 | Zaleski, Jr. et al. |
| 5,854,991 A | 12/1998 | Gupta et al. |
| 5,864,058 A | 1/1999 | Chen-Kang |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,057,784 A | 5/2000 | Schaaf et al. |
| 6,147,496 A | 11/2000 | Strack et al. |
| 6,150,822 A | 11/2000 | Hong et al. |
| 6,158,532 A | 12/2000 | Logan et al. |
| 6,163,155 A | 12/2000 | Bittar |
| 6,181,138 B1 | 1/2001 | Hagiwara et al. |
| 6,191,586 B1 | 2/2001 | Bittar |
| 6,218,841 B1 | 4/2001 | Wu |
| 6,218,842 B1 | 4/2001 | Bittar |
| 6,230,822 B1 | 5/2001 | Sullivan et al. |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 | 11/2002 | Bittar |
| 6,538,447 B2 | 3/2003 | Bittar |
| 6,540,033 B1 | 4/2003 | Sullivan et al. |
| 6,541,979 B2 | 4/2003 | Omeragic |
| 6,543,312 B2 | 4/2003 | Sullivan et al. |
| 6,566,881 B2 | 5/2003 | Omeragic et al. |
| 6,571,886 B1 | 6/2003 | Sullivan |
| 6,573,722 B2 | 6/2003 | Rosthal et al. |
| 6,614,229 B1 | 9/2003 | Clark et al. |
| 6,626,251 B1 | 9/2003 | Sullivan et al. |
| 6,648,082 B2 | 11/2003 | Schultz et al. |
| 6,691,802 B2 | 2/2004 | Schultz et al. |
| 6,698,536 B2 | 3/2004 | Moran et al. |
| 6,710,600 B1 | 3/2004 | Kopecki et al. |
| 6,736,222 B2 | 5/2004 | Kuckes et al. |
| 6,777,940 B2 | 8/2004 | Macune |
| 6,778,127 B2 | 8/2004 | Stolarczyk et al. |
| 6,810,331 B2 | 10/2004 | Bittar et al. |
| 6,814,162 B2 | 11/2004 | Moran et al. |
| 6,850,068 B2 | 2/2005 | Chemali et al. |
| 6,863,127 B2 | 3/2005 | Clark et al. |
| 6,885,943 B2 | 4/2005 | Bittar et al. |
| 6,900,640 B2 | 5/2005 | Fanini et al. |
| 6,911,824 B2 | 6/2005 | Bittar |
| 6,944,546 B2 | 9/2005 | Xiao et al. |
| 6,958,610 B2 | 10/2005 | Gianzero et al. |
| 7,017,662 B2 | 3/2006 | Schultz et al. |
| 7,019,528 B2 | 3/2006 | Bittar |
| 7,038,455 B2 | 5/2006 | Beste et al. |
| 7,046,010 B2 | 5/2006 | Hu et al. |
| 7,066,280 B2 | 6/2006 | Sullivan et al. |
| 7,138,803 B2 | 11/2006 | Bittar |
| 7,202,670 B2 | 4/2007 | Omeragic et al. |
| 7,207,215 B2 | 4/2007 | Spross et al. |
| 7,227,363 B2 | 6/2007 | Gianzero et al. |
| 7,265,552 B2 | 9/2007 | Bittar |
| 7,316,277 B2 | 1/2008 | Jeffryes |
| 7,345,487 B2 | 3/2008 | Bittar et al. |
| 7,394,257 B2 | 7/2008 | Martinez et al. |
| 7,427,863 B2 | 9/2008 | Bittar |
| 7,557,579 B2 | 7/2009 | Bittar |
| 7,557,580 B2 | 7/2009 | Bittar |
| 7,657,377 B2 * | 2/2010 | Sinclair et al. ................ 702/7 |
| 7,659,722 B2 | 2/2010 | Bittar |
| 7,786,733 B2 | 8/2010 | Seydoux et al. |
| 7,848,887 B2 | 12/2010 | Yang et al. |
| 2003/0051914 A1 | 3/2003 | Bittar |
| 2003/0055565 A1 | 3/2003 | Omeragic |
| 2003/0062197 A1 | 4/2003 | Moran et al. |
| 2003/0076107 A1 | 4/2003 | Fanini et al. |
| 2004/0196047 A1 | 10/2004 | Fanini et al. |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0140373 A1 | 6/2005 | Li et al. |
| 2005/0218898 A1 | 10/2005 | Fredette et al. |
| 2006/0011385 A1 | 1/2006 | Seydoux et al. |
| 2006/0015256 A1 | 1/2006 | Hassan et al. |
| 2006/0125479 A1 | 6/2006 | Chemali et al. |
| 2006/0244455 A1 * | 11/2006 | Bittar ........................... 324/337 |
| 2006/0272859 A1 | 12/2006 | Pastusek et al. |
| 2007/0186639 A1 | 8/2007 | Spross et al. |
| 2007/0272442 A1 | 11/2007 | Pastusek et al. |
| 2007/0278008 A1 | 12/2007 | Kuckes et al. |
| 2008/0018895 A1 * | 1/2008 | Opsal ........................... 356/365 |
| 2008/0136419 A1 | 6/2008 | Seydoux et al. |
| 2009/0015260 A1 | 1/2009 | Bittar |

FOREIGN PATENT DOCUMENTS

| | | |
|---|---|---|
| EP | 0814349 | 12/1997 |
| EP | 0840142 | 5/1998 |
| EP | 0093519 | 7/1999 |
| EP | 2110687 | 8/2011 |

| | | |
|---|---|---|
| FR | 2 699 286 | 6/1994 |
| GB | 2 279 149 | 12/1994 |
| GB | 2468734 | 9/2010 |
| RU | 2043656 | 9/1995 |
| RU | 2107313 | 3/1998 |
| RU | 2279697 | 10/2003 |
| RU | 2305300 | 8/2007 |
| WO | WO-9531736 | 11/1995 |
| WO | WO9800733 | 1/1998 |
| WO | WO-98/45733 | 10/1998 |
| WO | WO-0050926 | 8/2000 |
| WO | WO0155748 | 8/2001 |
| WO | WO03069120 | 8/2003 |
| WO | WO-2006/030489 | 12/2007 |
| WO | WO-2007/145859 | 12/2007 |
| WO | WO-2008/115229 | 9/2008 |
| WO | WO-2009029517 | 3/2009 |

OTHER PUBLICATIONS

"Advisory Action", dated Sep. 15, 2005, U.S. Appl. No. 10/616,429, "Electromagnetic Wave Resistivity Tool Having a Tilted Antenna for Geosteering Within a Desired Payzone", filed Jul. 9, 2003.
"Canadian Office Action", dated Jun. 7, 2005, Application No. 2,415,563, "Electromagnetic Wave Resistivity Tool With a Tilted Antenna", filed Jul. 10, 2001.
"Canadian Office Action", dated Jan. 23, 2009, Application No. 2,415,563, "Electromagnetic Wave Resistivity Tool With a Tilted Antenna", filed Jan. 10, 2001.
"Canadian Office Action", dated Jan. 29, 2007, Application No. 2,415,563, "Electromagnetic Wave Resistivity Tool With a Tilted Antenna", filed Jul. 10, 2001.
"Canadian Office Action", dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000.
"Canadian Office Action", dated Nov. 1, 2007, Application No. 2,415,563, "Electromagnetic Wave Resistivity Tool With a Tilted Antenna", filed Jan. 10, 2001.
"European Office Action", dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Apr. 29, 2008, Application No. 00908351.0, "Electromagnetic Wave Resistivity Tool Having Tilted Antenna", filed Jan. 24, 2000.
"European Office Action", dated Jul. 31, 2007, Application No. 00908351.0, "Electromagnetic Wave Resistivity Tool Having a Tilted Antenna for Determining the Horizontal and Vertical Resistivities and Relative Dip Angle in Anisotropic Earth Formations" filed Jan. 24, 2000.
"European Office Action", dated Jul. 31, 2007, Application No. 00908351.0, "Electromagnetic Wave Resistivity Tool Having Tilted Antenna", filed Jan. 24, 2000.
"European Office Action", dated Sep. 13, 2007, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"European Office Action", dated Sep. 23, 3008, Application No. 01096 294.3, Electromagnetic wave resistivity tool having a tilted antenna for determining the horizontal and vertical resistivities and relative dip angle in anisotropic earth formations Jul. 10, 2001.
"European Office Action", dated Jul. 17, 2006, Application No. 01 096 294.3 , Electromagnetic wave resistivity tool having a tilted antenna for determining the horizontal and vertical resistivities and relative dip angle in anisotropic earth formations, Jul. 10, 2001.
"European Supplemental Search Report", dated Jun. 12, 2003 Application No. 00908351.0, "Electromagnetic Wave Resistivity Tool Having a Tilted Antenna for Determining the Horizontal and Vertical Resistivities and Relative Dip Angle in Anisotropic Earth Formations", filed Jan. 24, 2000.
"Eurpoean Office Action", dated Sep. 27, 2005, Application No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
"PCT International Preliminary Examination Report", dated Nov. 4, 2002, Application No. PCT/US01/41319 "Electromagnetic Wave Resistivity Tool Having a Tilted Antenna for Geosteering Within a Desired Payzone", filed Jul. 10, 2001.
"PCT International Search Report and Written Opinion", dated May 15, 2000, Application No. PCT/US00/01693, "Electromagnetic Wave Resistivity Tool Having a Tilted Antenna for Determining the Horizontal and Vertical Resistivities and Relative Dip Angle in Anisotropic Earth Formations", 01/24/200.
"PCT International Search Report", dated Jan. 31, 2008, Application No. PCT/US07/15806, "Modular Geosteering Tool Assembly", filed Jul. 11, 2007.
"PCT International Search Report", dated Feb. 5, 2008, Application No. PCT/US07/64221, "Robust Inversion Systems and Methods for Azimuthally Sensitive Resistivity Logging Tools", filed Mar. 16, 2007.
"PCT International Search Report", dated Feb. 27, 2008, Application No. PCT/US07/75455, "Resistivity Logging with Reduced Dip Artifacts", filed Aug. 8, 2007.
"PCT International Search Report", dated Apr. 30, 2008, Application No. PCT/US06/62149, Antenna Coupling Component Measurement Tool Having a Rotating Antenna Configuration, filed Dec. 15, 2006.
"PCT International Search Report", dated May 15, 2002, Application No. PCT/US00/01693, Electromagnetic Wave Resistivity Tool Having a Tilted Antenna for Determining the Horizontal and Vertical Resistivities and Relative Dip Angle in Anisotropic Earth Formations, filed Jan. 24, 2000.
"PCT International Search Report", dated May 15, 2008, Application No. PCT/US07/15744, "Method and Apparatus for Building a Tilted Antenna", filed Jul. 11, 2007.
"PCT International Search Report", dated Sep. 18, 2001, Application No. PCT/US01/41319 "Electromagnetic Wave Resistivity Tool Having a Tilted Antenna for Geosteering Within a Desired Payzone", filed Jul. 10, 2001.
"PCT International Search Report", dated Sep. 18, 2001, Application No. US01/41319, "Electromagnetic Wave Resistivity Tool Having a Tilted Antenna for Determining the Horizontal and Vertical Resistivities and Relative Dip Angle in Anisotropic Earth Formations", filed Aug. 6, 2002.
"PCT Written Opinion", dated Aug. 6, 2002, International Application No. PCT/US01/41319, "Electromagnetic Wave Resistivity Tool Having a Tilted Antenna for Geosteering Within a Desired Payzone", filed Jul. 10, 2001.
"US Final Office Action", dated Jan. 19, 2007, U.S. Appl. No. 11/457,709, "Electromagnetic Wave Resistivity Tool Having a Tilted Antenna for Geosteering Within a Desired Payzone", filed Jul. 14, 2006.
"US Final Office Action", dated Jun. 6, 2005, U.S. Appl. No. 10/616,429, "Electromagnetic Wave Resistivity Tool Having a Tilted Antenna for Geosteering Within a Desired Payzone", filed Jul. 9, 2003.
"US Final Office Action", dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Formations", filed May 27, 2008.
"US Non-Final Office Action", dated Apr. 26, 2000, Application No. 09/23832, "Electromagnetic Wave Resistivity Tool Having a Tilted Antenna for Determining the Horizontal and Vertical Resistivities and Relative Dip Angle in Anisotropic Earth Formations", filed Jan. 28, 1999.
"US Non-Final Office Action", dated Jul. 28, 2003, Application No. 10/255,048, "Electromagnetic Wave Resistivity Tool Having a Tilted Antenna for Determining the Horizontal and Vertical Resistivities and Relative Dip Angle in Anisotropic Earth Formations", filed Sep. 25, 2002.
"US Non-Final Office Action", dated Aug. 26, 2004, Application No. Jul. 9, 2003, "Electromagnetic Wave Resistivity Tool Having a Tilted Antenna for Geosteering Within a Desired Payzone", filed Jul. 9, 2003.
"US Non-Final Office Action", dated Sep. 6, 2007, U.S. Appl. No. 11/745,822, Electromagnetic Wave Resistivity Tool Having a Tilted Antenna for Geosteering Within a Desired Payzone:, filed May 8, 2007.
"US Non-Final Office Action", dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005.
"US Non-Final Office Action", dated Aug. 18, 2006, U.S. Appl. No. 11/457,709, "Electromagnetic Wave Resistivity Tool Having a Tilted Antenna for Geosteering Within a Desired Payzone", filed Jul. 14, 2006.
Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006), pp. 1-14.
Bittar, Michael S., "Processing Resistivity Logs", U.S. Appl. No. 60/821,721, filed Aug. 8, 2006.
Bittar, Michael S., "Tool for Azimuthal Resistivity Measurement and Bed Boundary Detection", U.S. Appl. No. 60/821,988, filed Aug. 10, 2006.
Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figures.
Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs of Figures.
Bittar, Michael S., et al., "The Effects of Rock Anisotropy on MWD Electromagnetic Wave Resistivity Sensors", The Log Analyst, (Jan. 1996), pp. 20-30.
Bittar, Michael S., et al., "The Effects of Rock Anisotropy on MWD Electromagnetic Wave Resistivity Sensors", SPWLA 35th Annual Logging Symposium, (Jun. 19, 1994), 18 pgs.
Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.
Bittar, Michale S., PCT Application US2007/075455, filed Aug. 8, 2007, Resistivity Logging with Reduced Dip Artifacts.
Bonner, S. et al., "A New Generation of Electrode Resistivity Measurements for Formation Evaluation While Drilling", SPWLA 35th Annual Logging Symposium, (Jun. 19, 1994), pp. 1-19.
Clark, Brian et al., "A Dual Depth Resistivity Measurement for Fewd", SPWLA 29th Annual Logging Symposium, (Jun. 1988), 25 pgs.
Clark, Brian et al., "Electromagnetic Propagation Logging While Drilling: Theory and Experiment", SPE Formation Evaluation, (Sep. 1990), pp. 263-271.
Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5, plus 3 pgs of Figures.
Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.
Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.
Mack, S. G., et al., "MWD Tool Accurately Measures Four Resistivities", Oil & Gas Journal, (May 25, 1992), pp. 1-5.

Meyer, W. H., "New Two Frequency Propagation Resistivity Tools", SPWLA 36th Annual Logging Symposium, (Jun. 26-29, 1995),12 pgs.
Rodney, Paul F., et al., "Electromagnetic Wave Resistivity MWD Tool", SPE Drilling Engineering, (Oct. 1986), pp. 37-346.
"Australian First Examiner's Report", dated Mar. 5, 2010, Appl No. 2007349251, "Robust Inversion Systems and Methods for Azimuthally Sensitive Resistivity Logging Tools" filed Oct. 3, 2008.
"EP Non-Final Office Action", dated Dec. 30, 2009, Appl No. 01 962 294.03, Electromagnetic Wave Resistivity Tool Having a Tilted Antenna for Geosteering Within a Desired Payzone, filed Jul. 1, 2001, 3 pgs.
"European Office Action", dated Sep. 3, 2010, Appl No. 09166567.9, Electromagnetic Wave Resistivity Tool Having a Tilted Antenna, filed Jul. 28, 2009, 4 pgs.
"European Search Report", dated Sep. 25, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 7 pgs.
"European Search Report", dated Oct. 16, 2009, Appl No. 09166567.9, Electromagnetic Wave Resistivity Tool Having a Tilted Antenna, filed Jul. 28, 2009, 5 pgs.
"European Search Report", dated Nov. 17, 2009, Appl No. 09166404.5, "Electromagnetic Wave Resistivity tool Having a Tilted Antenna for Determining the Horizontal and Vertical Resistivities and Relative Dip Angle in Anisotropic Earth Formations", filed Jul. 24, 2009, 4 pgs.
"European Search Report", dated Nov. 20, 2009, Appl No. 09166405.2, "Electromagnetic Wave Resistivity Tool Having a Tilted Antenna for Determining the Horizontal and Vertical Resistivities and Related Dip Angle in Anisotropic Earth Formations", filed Jul. 24, 2009, 6 pgs.
"European Search Report", dated Dec. 14, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 9 pgs.
"Indonisia First Office Action", dated Sep. 2009, Appl No. WOO200803740, Method and Apparatus for Building a Tilted Antenna, filed Nov. 19, 2008, 2 pgs.
"Malaysian Office Action", dated Nov. 30, 2010, Appl No. 032599, "Robust Inversion Systems and Methods for Azimuthally Sensitive Resistivity Logging Tools" filed Oct. 15, 2008, 2 pgs.
"Malaysian Search Report", dated Nov. 30, 2010, Appl No. 032599, "Robust Inversion Systems and Methods for Azimuthally Sensitive Resistivity Logging Tools" filed Oct. 15, 2008, 1 pg.
"No Office Action", dated Apr. 3, 2009, Application No. 2001 3707, "Electromagnetic Wave Resistivity Tool Having a Tilted Antenna for Determining the Horizontal and Vertical Resistivities and Relative Dip Angle in Anisotropic Earth Formations", filed Jan 24, 2000, 5 pgs.
"PCT International Preliminary Report on Patentability", dated Apr. 30, 2008, Appl No. PCT/US06/62149, "Antenna Coupling Component Measurement Tool Having a Rotating Antenna Configuration", filed Dec. 15, 2006, 6 pgs.
"PCT International Preliminary Report on Patentability", dated Oct. 1, 2009, Appl No. PCT/US07/064221, "Robust Inversion Systems and Methods for Azimuthally Sensitive Resistivity Logging Tools", filed Mar. 16, 2007, 2 pgs.
"PCT International Search Report and Written Opinion", dated Jun. 27, 2008, Appl No. PCT/US08/51447, EM-Guided Drilling Relative to an Existing Borehole, 8 pgs.
"PCT Written Opinion of the International Searching Authority", dated Feb. 5, 2008, Appl No. PCT/US07/64221, "Robust Inversion systems and Methods for Azimuthally Sensitive Resistivity Logging Tools", filed Mar. 16, 2007, 4 pgs.
"Preliminary Report on Patentability", dated Jul. 29, 2010, Appl No. PCT/US08/51447, "EM-Guided Drilling Relative to an Existing Borehole", filed Jan. 18, 2008, 7 pgs.
"Russian Office Action", dated Jul. 9, 2009, Appl No. 2009104466, Modular Geosteering Tool Assembly, filed Feb. 10, 2009, 8 pgs.

"Singapore Examination Report", dated Oct. 28, 2010, Application No. 200808573-0, "Method and Apparatus for Building a Tilted Antenna", filed Nov. 19, 2008, 6 pgs.

"Singapore First Office Action", dated Apr. 11, 2009, Appl. No. 200808573-0, "Method and Apparatus for Building a Tilted Antenna", Filing Date Nov. 19, 2008, 8 pgs.

"US Final Office Action", dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", May 18, 2009, 24 pgs.

"US Final Office Action", dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.

"US Non-Final Office Action", dated Mar. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 25 pgs.

"US Non-Final Office Action", dated Jun. 3, 2010, U.S. Appl. No. 12/467,434, "Electromagnetic Wave Resistivity Tool Having a Tilted Antenna for Geosteering Within a Desired Payzone", filed May 18, 2009, 19 pgs.

"US Non-Final Office Action", dated Dec. 23, 2010, U.S. Appl. No. 12/306,267, "Modular Geosteering Tool Assembly", filed Dec. 23, 2008, 18 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/127,634, filed May 28, 2008.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009.

Bittar, Michael S., "Electromagnetic Wave Resistivity Tool Having a Tilted Antenna for Geosteering Within a Desired Payzone", U.S. Appl. No. 09/615,501, filed Jul. 13, 2000.

Bittar, Michael S., "Electromagnetic Wave Resistivity Tool Having a Tilted Antenna for Geosteering Within a Desired Payzone", U.S. Appl. No. 10/255,048, filed Sep. 25, 2002.

Bittar, Michael S., "Electromagnetic Wave Resistivity Tool Having a Tilted Antenna for Geosteering Within a Desired Payzone", U.S. Appl. No. 10/616,429, filed Jul. 9, 2003.

Bittar, Michael S., "Electromagnetic Wave Resistivity Tool Having a Tilted Antenna for Geosteering Within a Desired Payzone", U.S. Appl. No. 11/198,068, filed Aug. 5, 2005.

Bittar, Michael S., "Electromagnetic Wave Resistivity Tool Having a Tilted Antenna for Geosteering Within a Desired Payzone", U.S. Appl. No. 11/457,709, filed Jul. 14, 2006.

Bittar, Michael S., "Electromagnetic Wave Resistivity Tool Having a Tilted Antenna for Geosteering Within a Desired Payzone", U.S. Appl. No. 12/127,672, filed May 27, 2008.

Bittar, Michael S., "Electromagnetic Wave Resistivity Tool Having a Tilted Antenna for Geosteering Within a Desired Payzone", U.S. Appl. No. 12/467,434, filed May 18, 2009.

Bittar, Michael S., et al., "Antenna Coupling Component Measurement Tool Having a Rotating Antenna Configuration", U.S. Appl. No. 12/294,557, filed Sep. 25, 2008.

Bittar, Michael S., et al., "Method and Apparatus Having Antennas Configured to Measure Electrical Anisotropy", U.S. Appl. No. 12/088,061, filed Mar. 25, 2008.

Gianzero, Stanley et al., "Method and Apparatus Having Antennas Configured to Measure Electrical Anisotropy", U.S. Appl. No. 10/957,415, filed Oct. 1, 2004.

Bittar, Michael S., "Electromagnetic Wave Resistivity Tool Having a Tilted Antenna for Geosteering Within a Desired Payzone", U.S. Appl. No. 11/745,822, filed May 8, 2007.

Bittar, Michael S., et al., "Look-Ahead Boundary Detection and Distance Measurement", U.S. Appl. No. 12/067,582, filed Mar. 20, 2008.

UK Examination Report, dated Aug. 19, 2011, Appl No. 0914189.6, "EM-Guided Drilling Relative to an Existing Borehole", filed Aug. 13, 2009, 5 pgs.

US Non-Final Office Action, dated Jul. 18, 2011, U.S. Appl. No. 12/306,954, "Method and Apparatus for Building a Tilted Antenna", filed Dec. 30, 2008, 21 pgs.

* cited by examiner

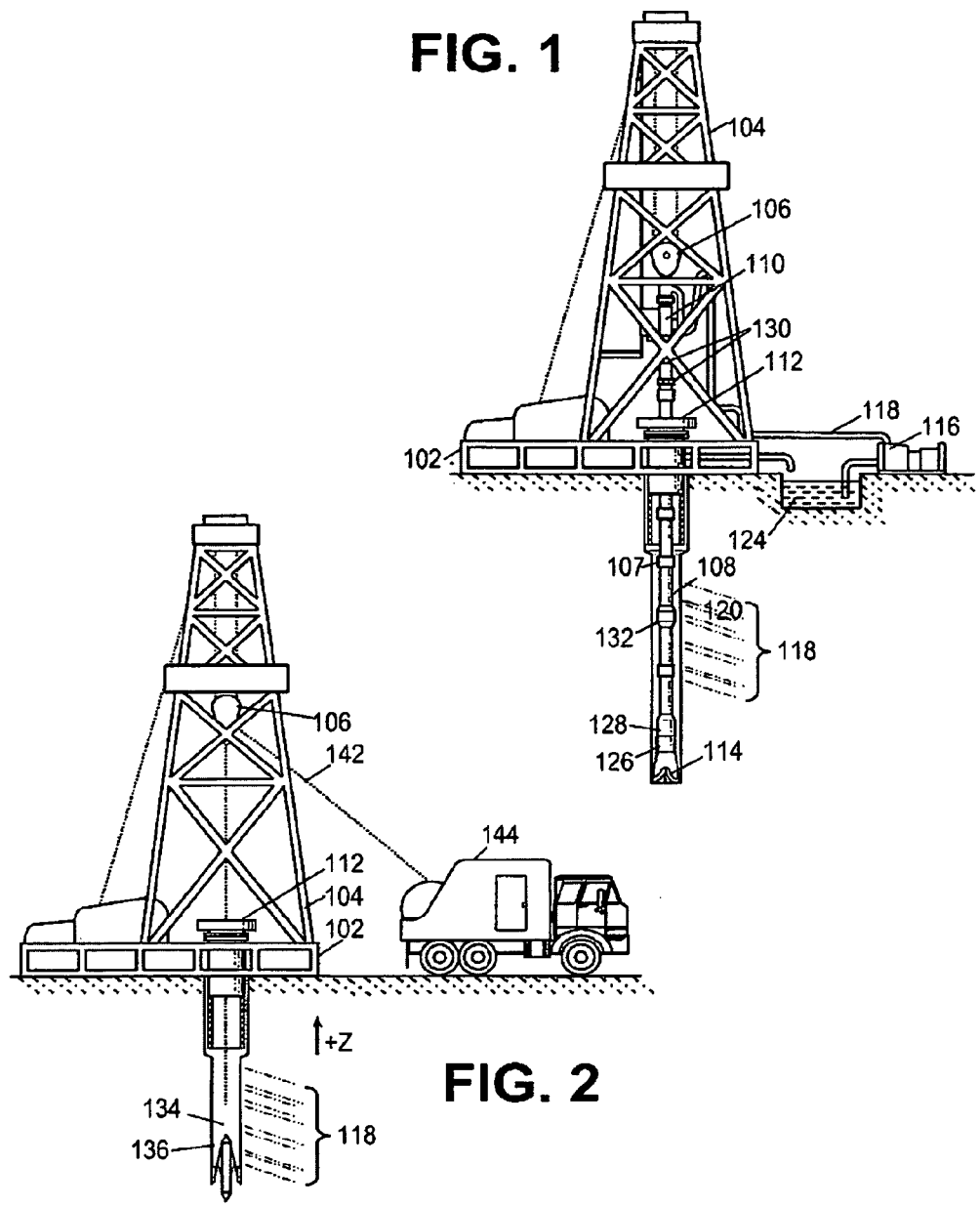

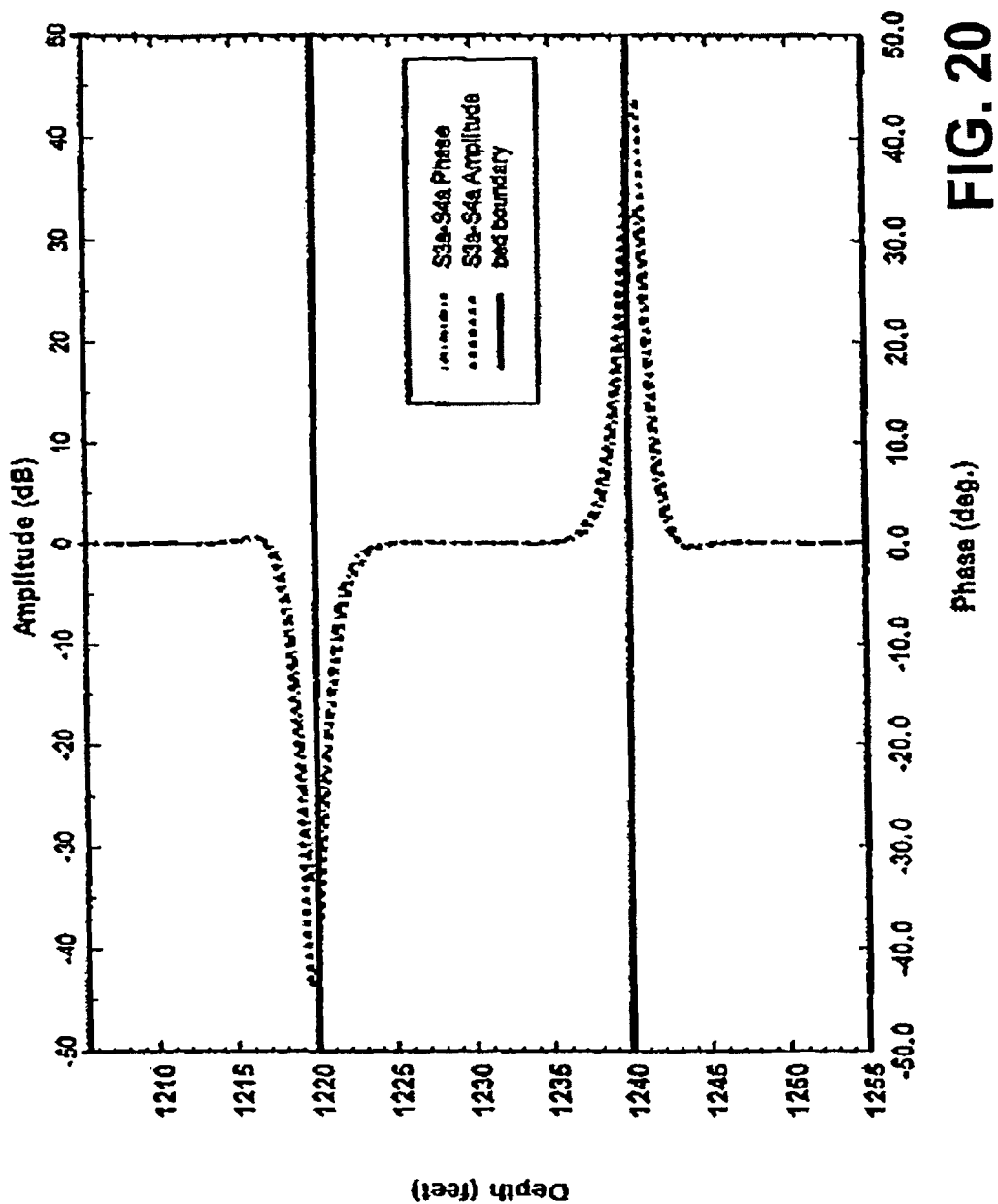

ROBUST INVERSION SYSTEMS AND METHODS FOR AZIMUTHALLY SENSITIVE RESISTIVITY LOGGING TOOLS

STATEMENT REGARDING FEDERALLY SPONSORED RESEARCH OR DEVELOPMENT

Not applicable.

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The formation region (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

If a formation is electrically isotropic, the resistivities measured at the various depths of investigation by such a resistivity logging tool will be the same. However, if the resistivities corresponding to the various depths of investigation are different, such differences indicate that the formation being measured is electrically anisotropic. In electrically anisotropic formations, the anisotropy is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta=[R_v/R_h]^{1/2}$.

The relative dip angle, $\theta$, is the angle between the tool axis and the normal to the plane of the formation. If the axis of a resistivity logging tool is perpendicular to the plane of an anisotropic formation (i.e., $\theta=0°$), both the phase shift and amplitude attenuation measurements reflect only the horizontal resistivity. However, if the axis of the tool is inclined with respect to the normal of the formation plane (i.e., for non-zero relative dip angle), the rock anisotropy affects the resistivity derived from phase shift measurements ("phase shift resistivity" or $R_\Phi$) differently than it affects the resistivity derived from amplitude attenuation measurements ("amplitude attenuation resistivity" or $R_A$). For small relative dip angles (e.g., $\theta$ less than about 45°), the difference between phase shift and amplitude attenuation resistivities is relatively small. However, this difference becomes significant for relative dip angles greater than about 50°, and the difference is large for horizontal boreholes (i.e., $\theta=90°$).

Thus anisotropy and dip each have significant effects on resistivity logging tool measurements. As a result, resistivity logging systems should account for formation anisotropy and relative dip if accurate resistivity logs are to be obtained. In U.S. Pat. No. 6,163,155, Michael Bittar discloses one such approach that employs resistivity logging tools having tilted transmitter and/or receiver antennas. Improvements to this disclosed approach have been developed and are presented herein.

BRIEF DESCRIPTION OF THE DRAWINGS

A better understanding of the various disclosed embodiments can be obtained when the following detailed description is considered in conjunction with the following drawings, in which:

FIG. 1 shows an illustrative logging while drilling environment including dipping formation beds;

FIG. 2 shows an illustrative wireline logging environment including dipping formation beds;

FIG. 20 is an illustrative graph of the difference between the tool responses of FIGS. 18 and 19.

Figure 3:
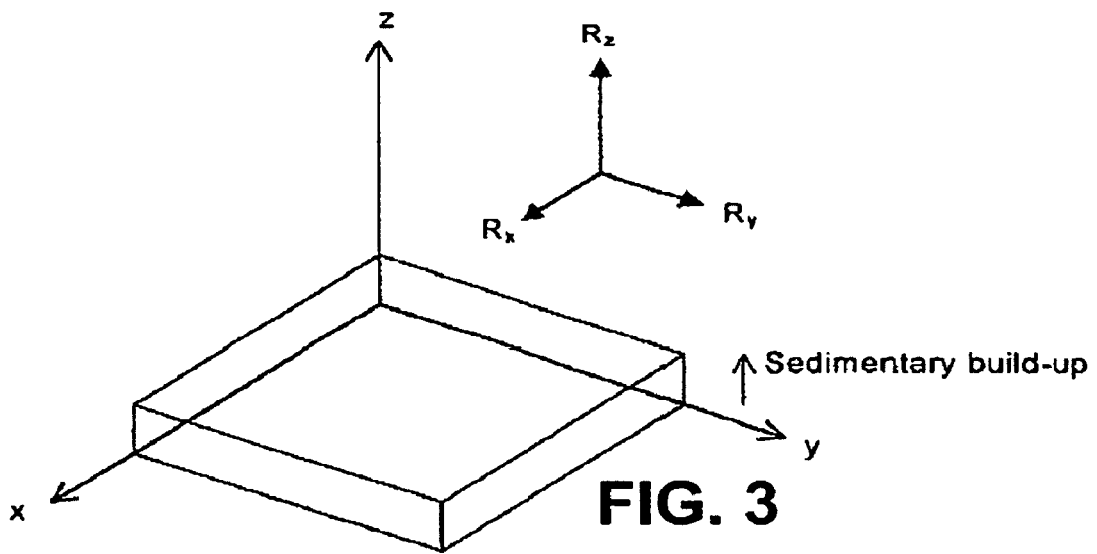
FIG. 3 is a schematic perspective view of a Cartesian coordinate system in a sedimentary earth formation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the appended claims.

DETAILED DESCRIPTION

Disclosed herein are various methods and systems for determining the horizontal resistivity, vertical resistivity, and relative dip angle of anisotropic earth formations. Some of the disclosed methods and systems measure sinusoidal variation of azimuthally sensitive resistivity logging tool measurements, determine parameters representative of the sinusoidal variation, and perform inversion based on the sinusoidal parameters. When cast in this manner, the inversion process may yield more accurate and consistent resistivity and dip angle estimates. The sinusoidal parameters preferably take the form of average and peak-to-peak measurements, but may also take other forms. Moreover, use of such sinusoidal parameters enables a condensed representation of the resistivity logging tool measurements, enabling significantly more efficient communication and storage of these measurements. The condensed representations continue to enable directional boundary detection and geosteering.

The disclosed tool configurations and operations are best understood in the context of the larger systems in which they operate. Accordingly, an illustrative logging while drilling (LWD) environment is shown in FIG. 1. A drilling platform 102 supports a derrick 104 having a traveling block 106 for raising and lowering a drill string 108. A kelly 110 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

The disclosed tool configurations and operations are best understood in the context of the larger systems in which they operate. Accordingly, an illustrative logging while drilling (LWD) environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Connected to the lower end of the drill string 108 is a drill bit 114. As bit 114 rotates, it creates a borehole 120 that passes through various formations 118. A pump 116 circulates drilling fluid through a supply pipe 118 to top drive 110, downhole through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

In wells employing acoustic telemetry for LWD, downhole sensors (including resistivity logging tool 126) are coupled to an acoustic telemetry transmitter 128 that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals.

An electromagnetic resistivity logging tool 126 is integrated into the bottom-hole assembly near the bit 114. As the bit extends the borehole through the formations, logging tool 126 collects measurements relating to various formation properties as well as the tool orientation and position and various other drilling conditions. The logging tool 126 may take the form of a drill collar, i.e., a thick-walled tubular that provides weight and rigidity to aid the drilling process. A telemetry sub 128 may be included to transfer tool measurements to a surface receiver 130 and to receive commands from the surface receiver. In some alternative embodiments, the telemetry sub 128 collects and stores tool measurements for later retrieval when the tool is brought back to the surface.

The orientation measurements may be performed using an azimuthal orientation indicator, which may include magnetometers, inclinometers, and/or accelerometers, though other sensor types such as gyroscopes may be used. Preferably, the tool includes a 3-axis fluxgate magnetometer and a 3-axis accelerometer. As is known in the art, the combination of those two sensor systems enables the measurement of the toolface angle, borehole inclination angle, and borehole azimuth angle. In some embodiments, the toolface and hole inclination angles are calculated from the accelerometer sensor output. The magnetometer sensor outputs are used to calculate the hole azimuth. With the toolface, the hole inclination, and the hole azimuth information, various resistivity logging tools disclosed herein can be used to steer the bit to the desirable bed. Specifically, an azimuthal response difference or the response ratio can be used effectively to enter a desired payzone or to stay within the payzone of interest.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity imaging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIGS. 1 and 2 show formations 118 that are not perpendicular to the borehole, a situation that may occur naturally or may occur due to directional drilling operations. When measuring formation resistivity and orientation, it is convenient to use the formation coordinate system shown in FIG. 3. FIG. 3 shows a portion of a sedimentary formation bed, with the z-axis oriented perpendicular to the plane of the formation in the direction of the sedimentary accretion. As previously mentioned, the formation resistivity when measured along this axis is often different than formation resistivity measured in the x-y plane. In a dipping bed, the x-axis is chosen to be oriented in the direction of deepest descent, i.e., "downhill".

Figure 4:
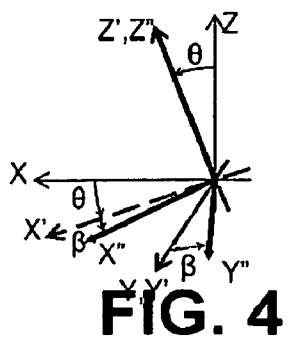
FIG. 4 shows a relationship between the coordinate systems of a borehole and a dipping formation bed.

The relationship between the formation coordinate system and the borehole coordinate system is shown in FIG. 4. The z-axis of the borehole coordinate system is aligned with the borehole's long axis, and the x-axis of the borehole coordinate system is directed to the north side (or alternatively, the high side) of the hole. As shown in FIG. 4, the two coordinate systems are related by two rotations. Beginning with the formation coordinate system (x,y,z), a first rotation of angle $\beta$ is made about the z axis. The resulting coordinate system is denoted (x',y',z'). Angle $\beta$ is the relative strike angle, which indicates the direction of the formation dip relative to the borehole's coordinate system. A second rotation of angle θ is then made about the y' axis. This aligns the formation coordinate system with the borehole coordinate system. Angle θ is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable. Accordingly, disclosed herein is an improved downhole method and apparatus for simultaneously determining the horizontal resistivity, vertical resistivity, and relative dip angle for anisotropic earth formations. Some system embodiments employ an electromagnetic logging tool having an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. The disclosed embodiments are suitable for LWD applications, and are also applicable to wireline and possibly other applications.

Also disclosed herein are an improved downhole method and apparatus for steering a downhole tool during directional drilling operations in order to maintain the borehole within a desired geological formation by providing an advance indication of the resistivity of a given bed before entry into that bed. In some embodiments, this steering capability is achieved by providing transmitter and receiver antennas that are mounted in non-parallel planes and computing the azimuthal difference or the ratio of the phase-based or amplitude-based responses of the receiver antennas. With such an antenna arrangement, the azimuthal ratio or difference of the responses indicates whether the resistivity of an approaching bed is higher or lower than the resistivity of the present bed. With such information, the driller may steer the drilling apparatus in order to maintain the borehole in a desired geological bed.

Figure 5:
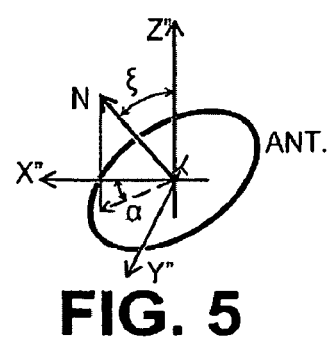
FIG. 5 shows a coordinate system for specifying the orientation of tilted loop antennas.

FIG. 5 shows a coordinate system for specifying the orientation of a loop antenna. The tool coordinate system (x", y", z") has a z-axis oriented parallel to the long axis of the logging tool. The x-axis is directed to the "tool face scribe line" that is used to specify the tool orientation. In the tool coordinate system, the orientation of the loop antenna is represented by a normal vector N that is perpendicular to the plane of the loop antenna windings. The tilt angle of the antenna is the angle $\xi$ between the z-axis and the normal vector N. The azimuthal orientation α of the loop antenna is the angle α between the x-axis and the projection of the normal vector N in the x-y plane.

Figure 6:
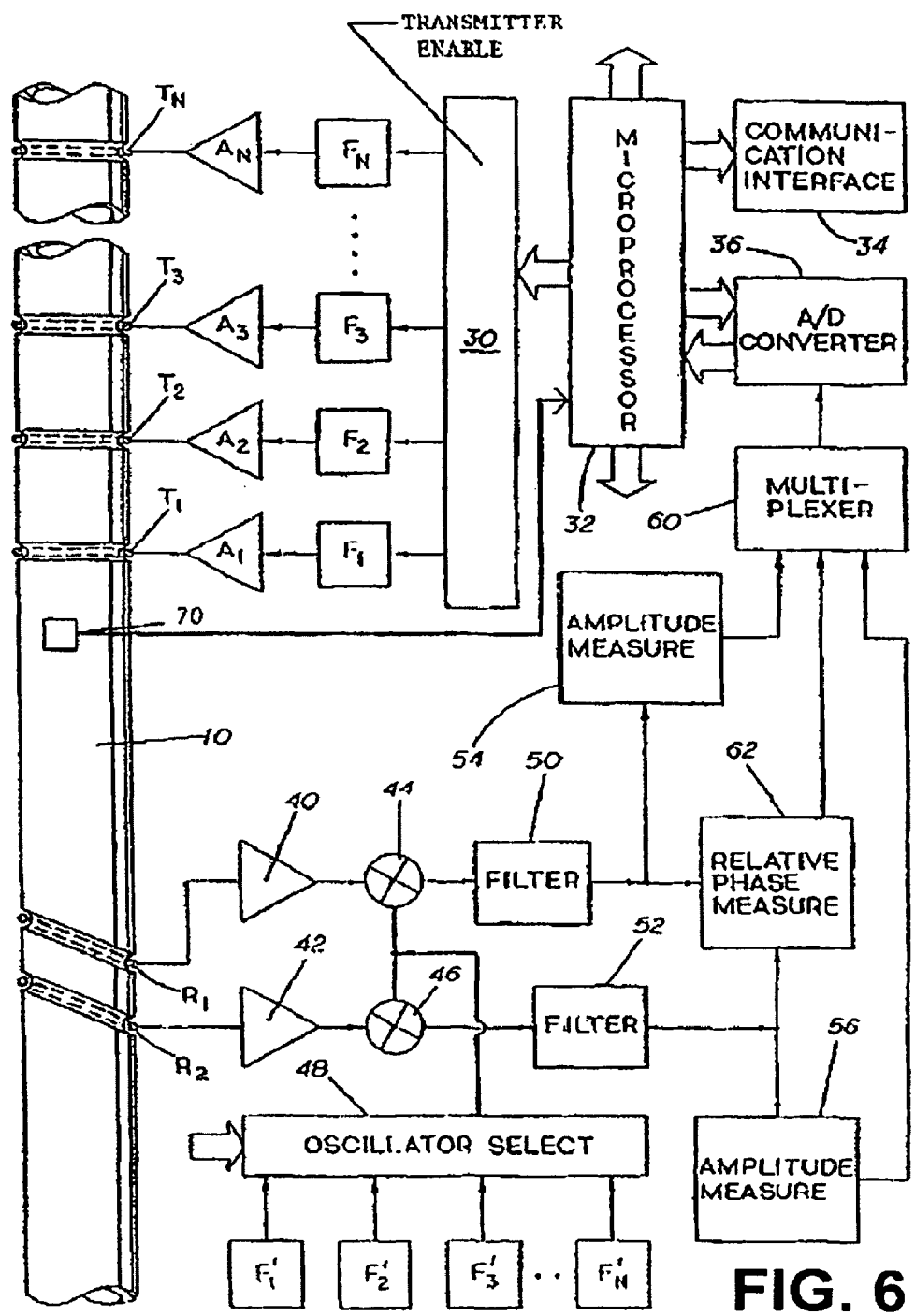
FIG. 6 shows a block diagram of the circuitry used in accordance with the present invention.

FIG. 6 shows an illustrative logging tool 10 having N coaxial transmitter antennas $T_1, T_2, T_3, \ldots, T_N$ spaced along the length of the logging tool. Illustrative logging tool 10 also has two tilted receiver antennas $R_1$ and $R_2$ that are axially spaced apart from the transmitter antennas and from each other. Preferably, the transmitter and receiver antennas are mounted in recesses in tool 10 and are protected by a non-conductive material or a material with non-conducting apertures. In some tool embodiments designed to operate at more than one frequency, for example, $f_1=2$ MHz and $f_2=1$ MHz, each receiver antenna includes a pair of coils, with one coil tuned to $f_1$ and one coil tuned to $f_2$. In such embodiments, the coils in each pair may be located side by side around the periphery of tool 10 or may be concentrically stacked. The transmitter and receiver antennas may be fabricated in accordance with the teachings of U.S. Pat. No. 4,940,943. It should be appreciated that the body of tool 10 is preferably made of steel in order to prevent tool 10 from becoming a weak link in the drill string 14.

It should be appreciated that logging tool 10 also has the requisite electronic circuitry for processing the signals received by the receivers antennas as disclosed further below, thereby converting the received signals into a log or another indication of formation resistivity. It should also be appreciated that the processed signals can be recorded within the electronics section of tool 10 or may be coneyed to the surface by a telemetry system for concurrent processing and readout at the surface.

The distance between the coils used for $R_1$ and $R_2$ is preferably six inches along the longitudinal axis of tool 10, but other receiver spacings may also be used. The distance between the receiver pair and the successively spaced transmitters will vary in some applications, as discussed hereinafter in greater detail. A preferred configuration contains a distance between $T_1$ and $R_1/R_2$ of 12 inches/18 inches; a distance between $T_2$ and $R_1/R_2$ of 24 inches/30 inches; and a distance between $T_3$ and $R_1/R_2$ of 36 inches/42 inches. In the foregoing sentence, it should be understood that the term "12 inches/18 inches," for example, indicates that the distance between $T_1$ and $R_1$ is 12 inches and that the distance between $T_1$ and $R_2$ is 18 inches, based upon $R_1$ and $R_2$ being six inches apart. Such spacing configurations are sometimes referred to herein using an abbreviated expression of, for example, "12/18."

Still referring to the illustrative logging tool of FIG. 6, amplifiers $A_1, A_2, A_3 \ldots A_N$ are coupled to the transmitter coils $T_1, T_2, T_3 \ldots T_N$, respectively. Each of the amplifiers is in turn driven by an oscillators $F_1, F_2, F_3 \ldots F_N$. The operating frequencies of the oscillators are preferably between about 0.5 MHz up to about 4 MHz. Because of power attenuation at greater depths of investigation, such as is the case with the longer spaced transmitters, the frequencies preferably conform to the relationship $F_1 \geqq F_2 \geqq F_3 \geqq \ldots F_N$. The oscillators $F_1, F_2, F_3 \ldots F_N$ are controlled by a transmitter enable circuit 30, which interfaces with a microprocessor 32, which in turn interfaces with a communication interface circuit 34 and an analog-to-digital (A/D) converter 36. Communication interface circuit 34 enables communication between the microprocessor 32 and a tool controller, integrated memory, a telemetry unit, and/or an external port for communicating with operators or computers once the tool has been removed from the borehole.

The receiver antennas $R_1$ and $R_2$ are respectively connected to amplifiers 40 and 42, which are connected, respectively, to mixer circuits 44 and 46. Oscillators $F_1, F_2, F_3 \ldots F_N$ are coupled to an oscillator select circuit 48, the output of which is connected to the inputs of mixer circuits 44 and 46. Oscillator select circuit 48 interfaces to microprocessor 32 to determine which oscillater is to be coupled to the mixer circuits.

The respective outputs of mixer circuits 44 and 46 drive low pass filters 50 and 52, respectively, the outputs of which drive amplitude measurement circuits 54 and 56, respectively. The outputs of amplitude measurement circuits 54 and 56 are connected to a multiplexer circuit 60. The outputs of low pass filter circuits 50 and 52 are also connected to the inputs of a relative phase measurement circuit 62, the output of which is fed into multiplexer 60. Under control of the microprocessor 32, multiplexer 60 forwards a selected one of its inputs to A/D converter 36 for sampling and conversion into a digital value that the microprocessor can store and process. The microprocessor 32 further acquires tool orientation measurements from orientation sensors 70, and determines a tool orientation to be associated with each resistivity measurement derived from the sampled receiver signals.

In the operation of the device and circuitry illustrated in FIG. 6, it should be appreciated that it is desirable to process intermediate frequency signals rather than the nominal signals received by receiver pair $R_1$ and $R_2$. Accordingly, the oscillators $F_1'$, $F_2'$, $F_3'$ ... $F_N'$ are designed to provide frequencies very near the corresponding frequencies $F_1$, $F_2$, $F_3$ ... $F_N$. For example, $F_N$ can be set at a frequency of 1.998 MHz and thus provide an intermediate frequency coming out of mixer circuits 44 and 46 of 0.002 MHz (2 KHz). In a similar fashion, $F_2'$ and $F_3'$ can be set at 1.998 MHz and 0.998 MHz, respectively. Thus, the only signals that pass to low pass filters 50 and 52 will be the intermediate frequencies which are obtained by mixing the frequencies of $F_1$, $F_2$, $F_3$ ... $F_N$ with the frequencies $F_1'$, $F_2'$, $F_3'$ ... $F_N'$, respectively. It should be appreciated that amplitude measurement circuit 54 provides a measure of the amplitude of the signal received by receiver antenna $R_1$, whereas amplitude measurement circuit 56 measures the amplitude of the incoming signals received by receiver antenna $R_2$. Similarly, relative phase measurement circuit 62 provides an indication of the phase difference between the signals received at receiver antenna $R_1$ and the signals received at receiver antenna $R_2$. The amplitude measurements (A) and the phase measurements ($\Phi$) (alternatively, the amplitude ratio and phase difference measurements) are each indicative of formation resistivity.

It should also be appreciated that the frequencies $F_1$, $F_2$, $F_3$ ... $F_N$ could all be the same frequency, though some embodiments employ different frequencies to account for increased power loss in the formation for larger transmitter-receiver antenna spacings. Preferably, the individual transmitter antennas fire in sequence, though in some alternative embodiments, simultaneous operation of the transmitter antennas is possible. However, those skilled in the art will recognize that simultaneous transmission of all of the transmitter signals will usually require additional filters and processing circuitry to enable the instrument to properly discriminate between the different frequencies.

Figure 7A:
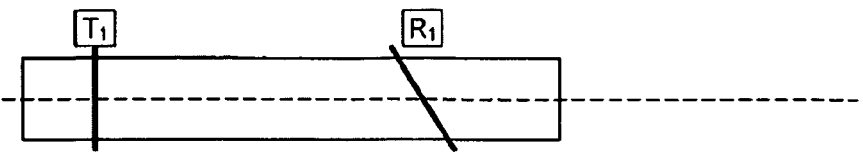
FIGS. 7A-7N show various illustrative antenna configurations for a resistivity logging tool.
Figure 7B:
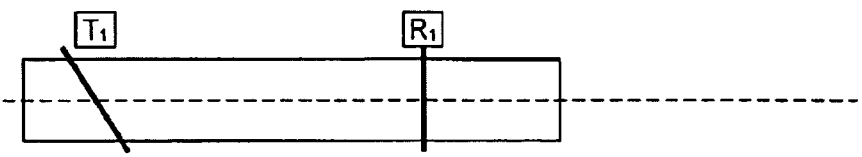
Figure 7C:
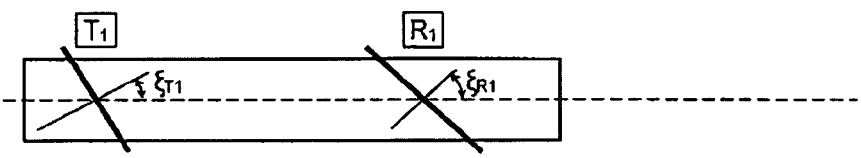
Figure 7D:
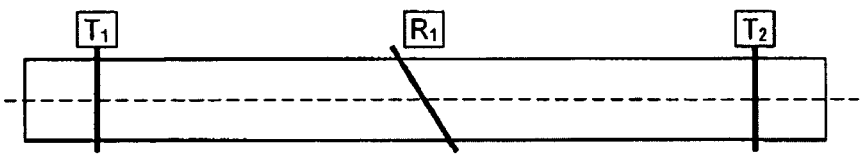
Figure 7E:
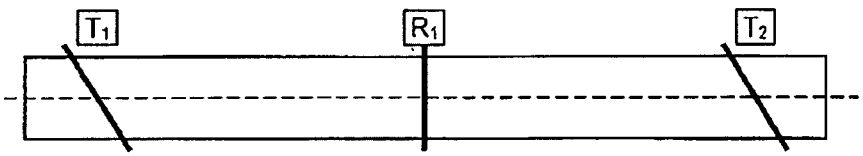
Figure 7F:
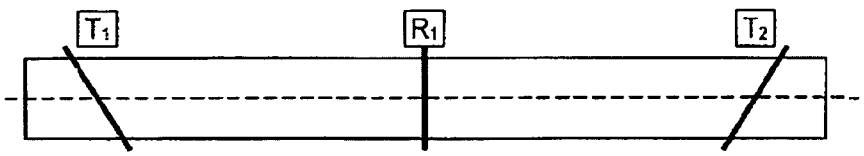
Figure 7G:
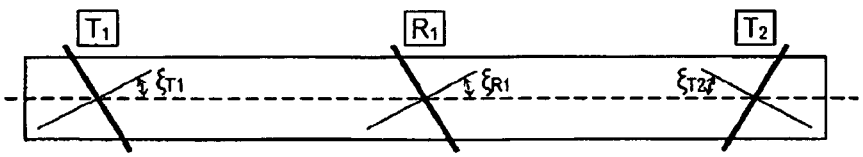
Figure 7H:
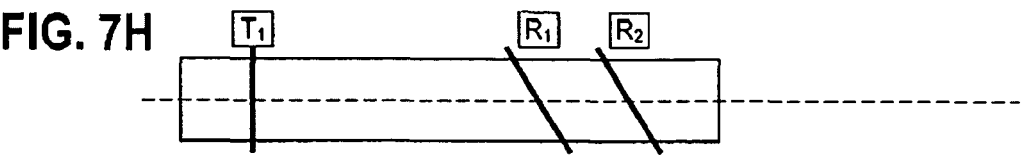
Figure 7I:
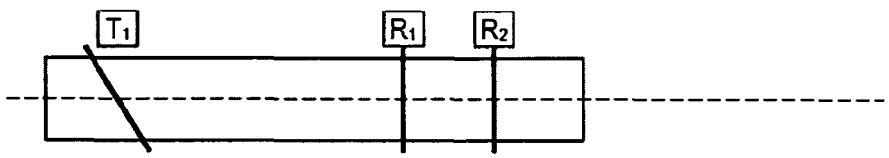
Figure 7J:
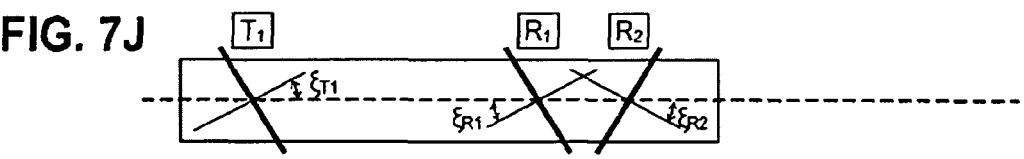
Figure 7K:
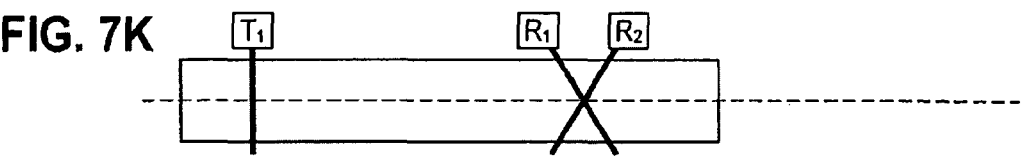
Figure 7L:
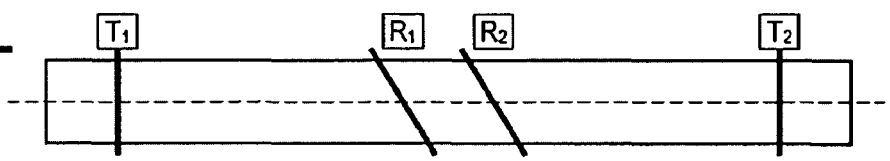
Figure 7M:
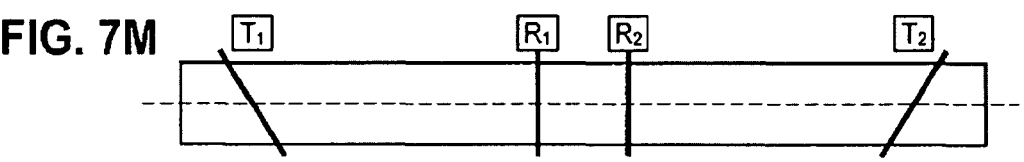
Figure 7N:
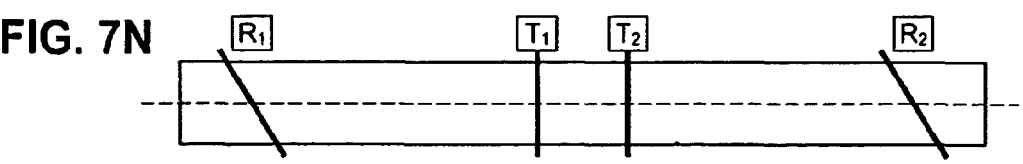

In addition to the antenna configuration of FIG. 6, FIGS. 7A-7N illustrate a variety of contemplated transmitter/receiver antenna configurations, each having azimuthal sensitivity due to a tilted transmitter antenna, a tilted receiver antenna, or both. FIG. 7A shows tool having a coaxial transmitter antenna $T_1$ and a tilted receiver antenna $R_1$. FIG. 7B shows a tool having a tilted transmitter antenna $T_1$ and a coaxial receiver antenna $R_1$. However, the antenna configuration does not necessarily include a coaxial antenna. FIG. 7C shows a tool having a transmitter antenna $T_1$ tilted at an angle $\xi_{T1}$ and a receiver antenna $R_1$ tilted at an angle $\xi_{R1}$.

While the antenna configurations of FIGS. 7A-7C provide useful resistivity measurements, such measurements generally suffer from asymmetric responses at bed boundaries, often making the resistivity logs unnecessarily difficult to interpret. To address this issue, symmetric antenna configurations may be employed. FIG. 7D shows a tool having a tilted receiver antenna $R_1$ positioned midway between two coaxial transmitter antennas $T_1$, $T_2$. FIG. 7E shows a tool having a coaxial receiver antenna $R_1$ positioned midway between two tilted transmitter antennas $T_1$, $T_2$. The titlted transmitter antennas of FIG. 7E are parallel, but this is optional, as shown by the transmitter antennas in FIG. 7F, which are tilted at opposite azimuthal angles. As before, the antenna configuration does not necessarily include a coaxial antenna. FIG. 7G shows a tool having a first transmitter antenna $T_1$ tilted at an angle $\xi_{T1}$, a second transmitter antenna $T_2$ tilted at an angle $\xi_{T2}$, and a receiver antenna $R_1$ tilted at an angle $\xi_{R1}$.

The antenna configurations of FIGS. 7A-7G are suitable for making absolute (non-differential) attenuation and phase shift measurements. While such measurements are useful, they may not have sufficient spatial resolution. To address this issue, differential antenna configurations may be employed. FIG. 7H shows a tool having a coaxial transmitter antenna $T_1$ and a pair of tilted receiver antennas $R_1$ and $R_2$. FIG. 7I shows a tool having a tilted transmitter antenna $T_1$ and a pair of coaxial receiver antennas $R_1$ and $R_2$. This antenna configuration does not necessarily include a coaxial antenna, and the pair of receiver antennas are not necessarily parallel. FIG. 7J shows a tool having a transmitter antenna $T_1$ tilted at an angle $\xi_{T1}$, a first receiver antenna $R_1$ tilted at an angle $\xi_{R1}$, and a second receiver antenna $R_2$ tilted at an angle $\xi_{R2}$.

Though not suitable for providing improved spatial resolution, FIG. 7K shows an antenna configuration having a pair of co-located receiver antennas $R_1$ and $R_2$ that are tilted in different azimuthal directions. This antenna configuration may be particularly suitable for deriving a directional steering signal.

By combining symmetric and differential antenna configuration designs, it is possible to create antenna designs that provide compensated measurements, i.e., measurements that are protected against errors attributable to temperature-induced drift in the electronic circuit components. FIG. 7L shows a tool having a pair of tilted receiver antennas $R_1$ and $R_2$ having a midpoint centered between two coaxial transmitter antennas $T_1$ and $T_2$. FIG. 7M shows a tool having a pair of coaxial receiver antennas $R_1$ and $R_2$ having a midpoint centered between two tilted transmitter antennas $T_1$ and $T_2$. Note that the tilted antennas may be parallel, but are not necessarily so. Moreover, in each of the foregoing antenna configurations, the transmitter and receiver roles may be exchanged in accordance with the principle of reciprocity. FIG. 7N, for example, shows a pair of coaxial transmitter antennas $T_1$ and $T_2$ having a midpoint centered between two tilted receiver antennas $R_1$ and $R_2$. Furthermore, in each of the foregoing antenna configurations, additional transmitter and receiver antennas may be present to enable measurements at additional transmitter-receiver antenna spacings.

Figure 8:
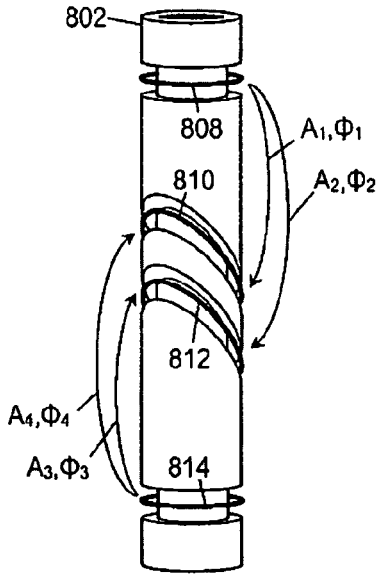
FIG. 8 shows an illustrative electromagnetic resistivity logging tool having compensated measurements.

FIG. 8 illustrates the amplitude and phase measurements that may be made by a compensated resistivity logging tool 802. In response to a signal from transmitter antenna 808, receiver antennas 810 and 812 measure signals having an attenuation $A_1$ and $A_2$, respectively, and having phase shifts $\phi_1$ and $\phi_2$, respectively. From these measurements a first differential attenuation ($\log A_2 - \log A_1$) and differential phase ($\phi_2 - \phi_1$) can be determined. Similarly, in response to a signal from transmitter antenna 814, receiver antennas 810 and 812 measure signals having an attenuation $A_4$ and $A_3$, respectively, and having phase shifts $\phi_4$ and $\phi_3$, respectively. From these measurements a second differential attenuation ($\log A_4 - \log A_3$) and second differential phase ($\phi_4 - \phi_3$) can be determined. The first and second differential attenuation measurements can then be averaged together (as can the first and second differential phase measurements) to obtain a compensated measurement, i.e., a measurement in which fixed biases in the electronics are canceled.

Figure 9:
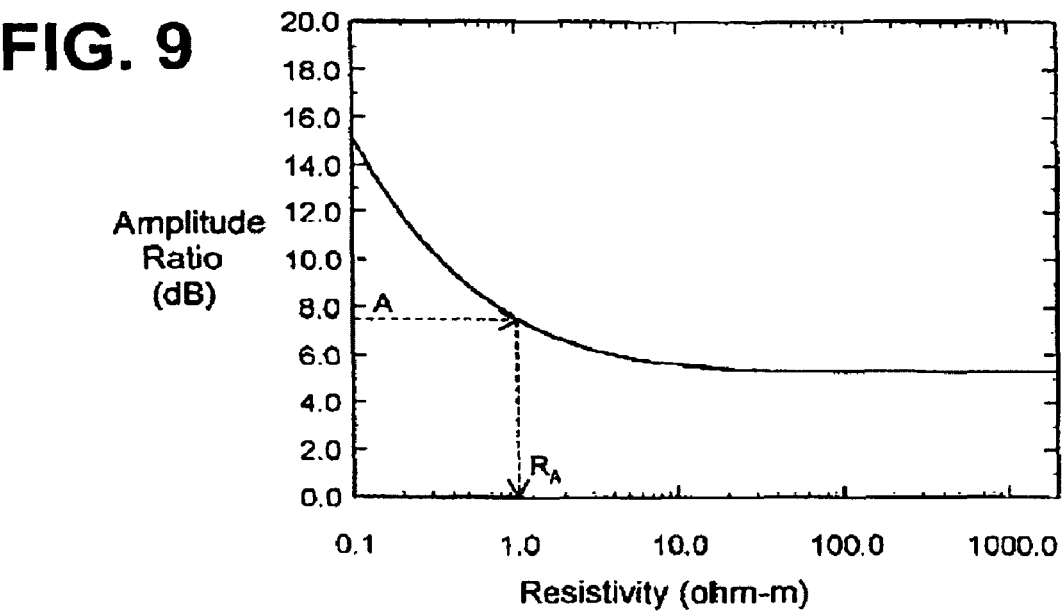
FIG. 9 is an illustrative graph of measured amplitude attenuation versus resistivity.
Figure 10:
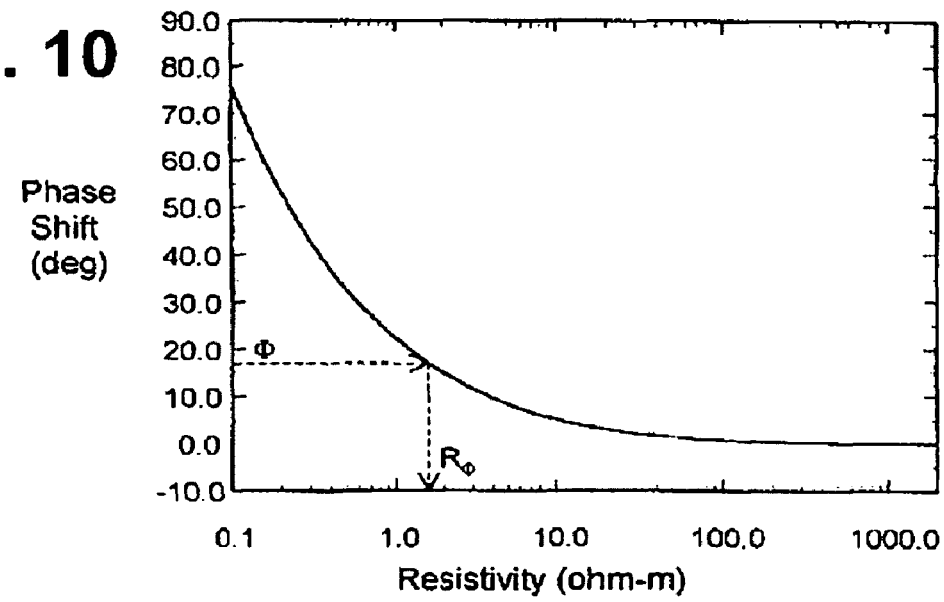
FIG. 10 is an illustrative graph of measured phase shift versus resistivity.

FIG. 9 shows an illustrative relationship between attenuation and isotropic formation resistivity for a tilted antenna resistivity logging tool. FIG. 10 shows an illustrative relationship between phase shift and isotropic formation resistivity for a tilted antenna resistivity logging tool. Such relationships are known in the art, and will be employed in the description below.

Figure 11:
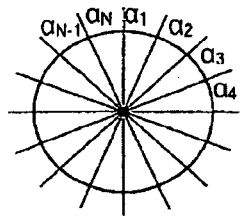
FIG. 11 shows an illustrative division of a borehore circumference into azimuthal bins.

To enable simultaneous measurement of resistivity, anisotropy, and dip, the disclosed logging tools and methods employ one or more tilted antennas to obtain azimuthally-sensitive resistivity measurements. The circumference of the tool (or borehole) is divided into azimuthal bins as shown in FIG. 11, and as the tool rotates and the tool face scribe line passes through each azimuthal bin, a set of resistivity measurements is made within each bin at a given position in the borehole. In various contemplated embodiments, the number of bins ranges as low as 6 or 8 bins, and as high as 16 or 32 bins. Depending on the relative rotational and axial traversal rates, multiple measurement sets may be obtained within each bin and combined (e.g., by averaging). The set of resistivity measurements may be absolute phase and/or attenuation measurements, or differential phase and/or attenuation measurements. However, in at least some embodiments, the resistivity measurements are compensated attenuation resistivity and compensated phase resistivity measurements (e.g., determined using relationships like those of FIGS. 9-10 and ignoring for the moment any dip or anisotropy effects), while in other embodiments the resistivity measurements are compensated attenuation resistivity measurements (e.g., using a relationship like that of FIG. 9). The set of resistivity measurements may include measurements at different frequencies and/or different transmitter-receiver spacings.

Figure 12:
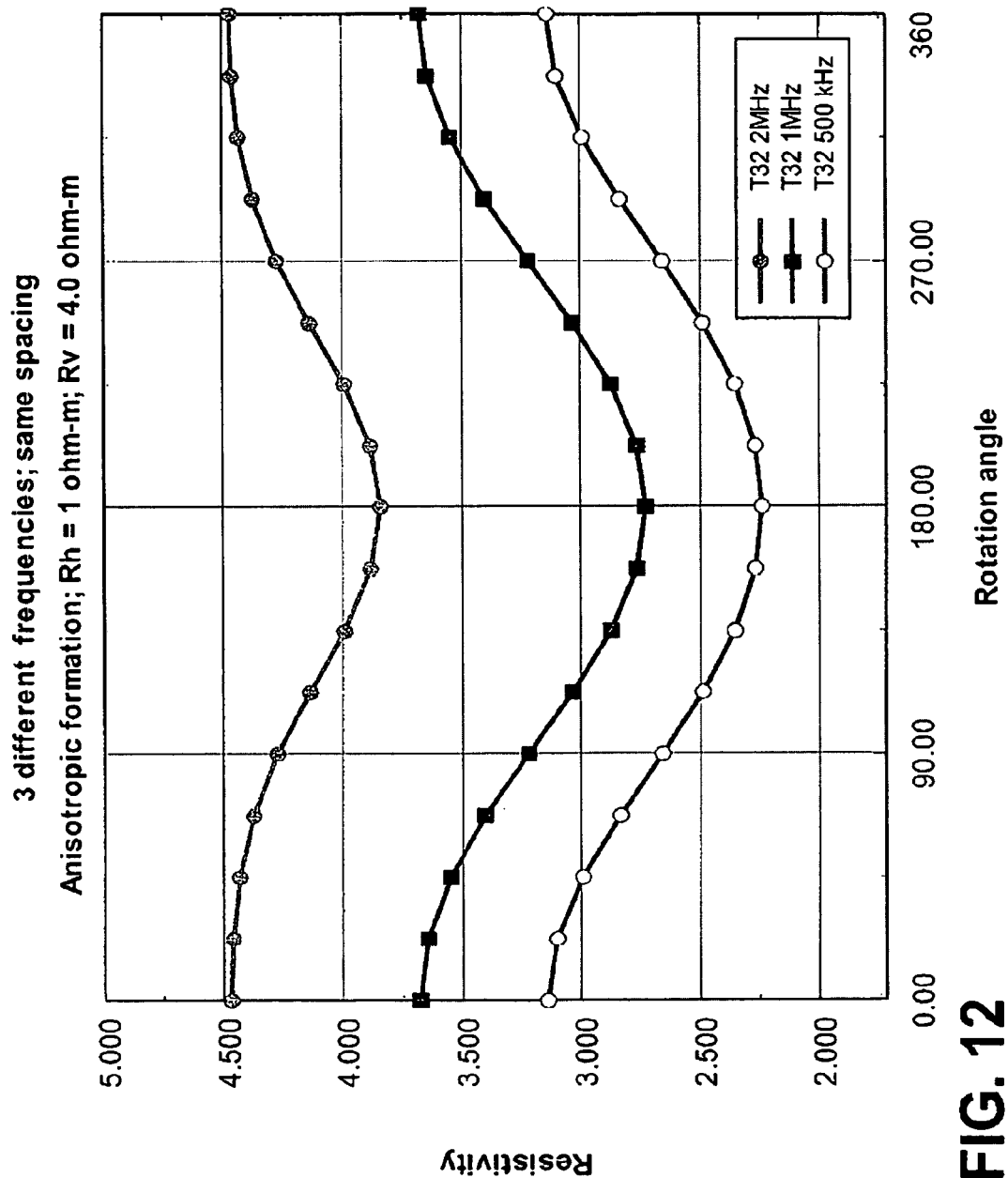
FIG. 12 shows an illustrative graph of measured phase resistivity as a function of rotation angle for different signal frequencies.
Figure 13:
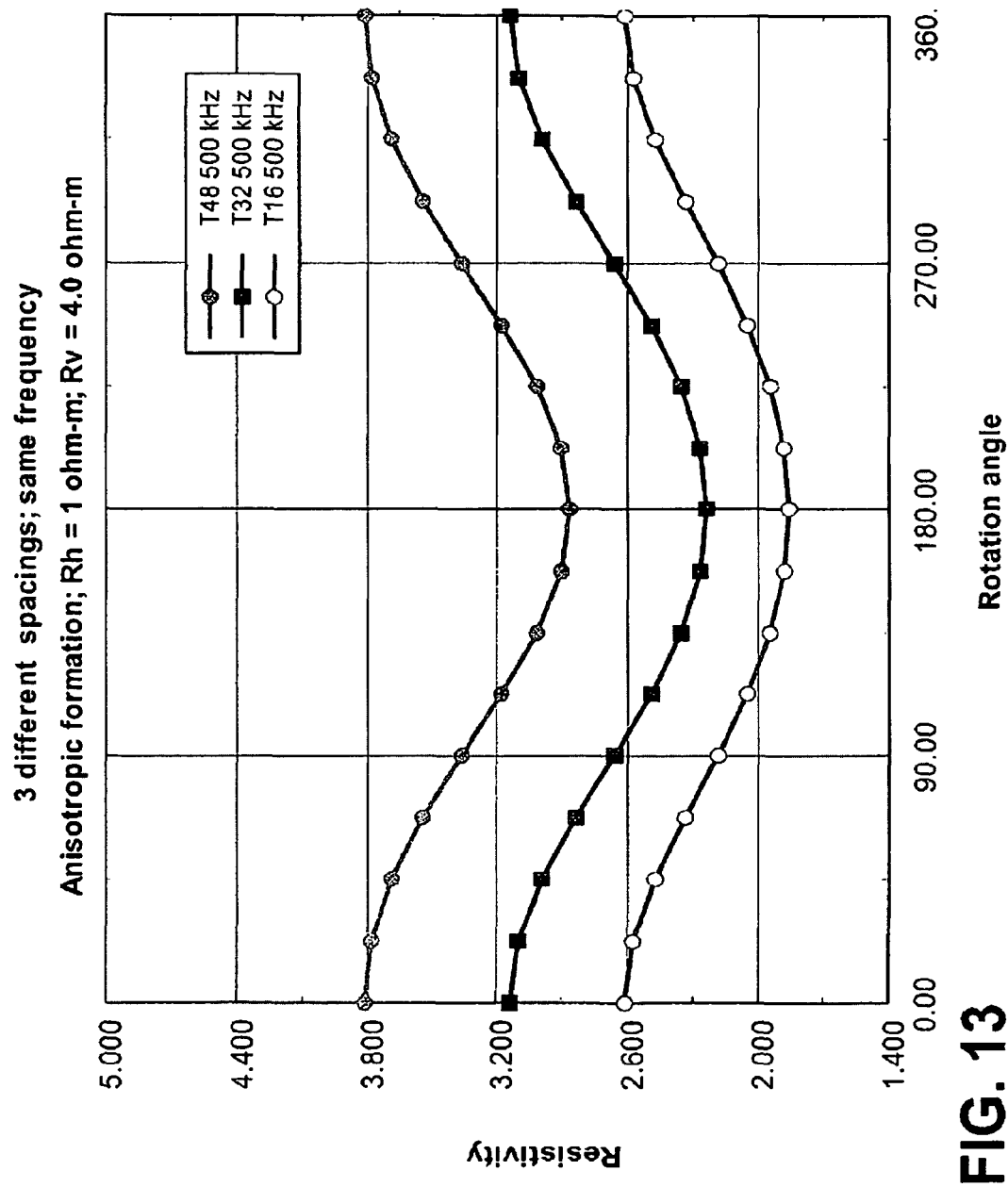
FIG. 13 shows an illustrative graph of measured phase resistivity as a function of rotation angle for different transmitter-receiver spacings.

FIG. 12 illustrates the azimuthal dependence of phase resistivity measurements at different frequencies in a dipping anisotropic formation. FIG. 13 illustrates the azimuthal dependence of phase resistivity measurements at different transmitter-receiver spacings. At each frequency and spacing, the resistivity measurements are approximately sinusoidal. The sinusoidal-like nature of these measurements is preferably exploited to condense the azimuthally-dependent measurements into a representative set of characteristic parameters. In some preferred embodiments, the characteristic parameters are (1) a mean value, (2) a max-to-min difference value, and (3) an identifier for the location of the peak of the sinusoid (e.g., an azimuthal bin number). Other sets of representative characteristic parameters may also be employed. For example, the mean value could be replaced with a maximum value, a minimum value, or a root-mean-square value. The max-to-min difference value could be replaced with a max-to-mean difference value or with a second extremum value that, when paired with the first parameter, indicates the amplitude of the sinusoidal-like oscillation. The location of the peak could be replaced with the location of the valley, or dropped entirely if the strike angle of the formation is already known. In some embodiments it may be sufficient to determine a subset of a representative set of sinusoidal parameters to characterize a selected aspect of the azimuthal variation.

The condensed representation of resistivity measurements at a given depth in the borehole may be useful for storage and telemetry communications. More importantly, however, is the use of these characteristic parameters in the inversion process for determining vertical and horizontal resistivities and formation dip. When an inversion process employing only the maximum value or mean value is compared to an inversion process that employs a mean value and a max-to-min difference value, a significantly improved accuracy is observed and the determined formation characteristics are more resistant to measurement noise.

As an illustrative example of how the inversion equations may be derived, consider the antenna configuration of FIG. 7A. When the tool penetrates an anisotropic formation at a relative dip angle of $\theta$ (see FIG. 4), the magnetic moment $M_T$ of the coaxial transmitter antenna can be considered as the superposition of a horizontal magnetic dipole ("HMD", a magnetic dipole oriented along the formation's x-axis) and a vertical magnetic dipole ("VMD", a magnetic dipole oriented along the formation's z-axis), with corresponding horizontal and vertical component magnetic moments $M_{T_h}$ and $M_{T_v}$, respectively, which are given by the equations $$M_{T_h} = M_T \sin\theta = I_t A_t \sin\theta \quad [1]$$

$$M_{T_v} = M_T \cos\theta = I_t A_t \cos\theta \quad [2]$$

where
  $I_t$=the current in the transmitter coil,
  $A_t$=the cross-sectional area of the transmitter coil, and
  $\theta$=the relative dip angle (the angle between the tool axis and the normal to the formation).
As shown by Luling, M. G., "Processing and Modeling 2-MHz Resistivity Tools in Dipping, Laminated, Anisotropic Formations," SPWLA 35th Annual Logging Symposium, Jun. 19-22, 1994, the HMD produces magnetic fields $H_{hx}$ and $H_{hz}$, and the VMD produces magnetic fields $H_{vx}$ and $H_{vz}$ as follows:

$$H_{hx} = \frac{M_T \sin\theta}{4\pi} \left( \frac{e^{ik_h L}}{L^3} \left[ \begin{array}{c} 3\sin^2\theta - 1 + \\ k_h^2 L^2 \cos^2\theta + \\ \frac{ik_h L}{\sin^2\theta} + ik_h L - \\ 3ik_h L \sin^2\theta \end{array} \right] - \frac{ik_h}{\sin^2\theta} e^{ik_h L \beta} \right) e^{ik_h L} \quad [3]$$

$$H_{hz} = \frac{M_T \cos\theta}{4\pi} \left( \frac{e^{ik_h L}}{L^3} \left[ \begin{array}{c} 3\cos\theta\sin\theta - k_h^2 L^2 \cos\theta\sin\theta - \\ 3ik_h L \cos\theta\sin\theta \end{array} \right] \right) \quad [4]$$

$$H_{vx} = \frac{M_T \sin\theta}{4\pi} \left( \frac{e^{ik_h L}}{L^3} \left[ \begin{array}{c} 3\cos\theta\sin\theta - k_h^2 L^2 \cos\theta\sin\theta - \\ 3ik_h L \cos\theta\sin\theta \end{array} \right] \right) \quad [5]$$

$$H_{vz} = \frac{M_T \cos\theta}{4\pi} \left( \frac{e^{ik_h L}}{L^3} \left[ \begin{array}{c} 3\cos^2\theta - 1 + k_h^2 L^2 \sin^2\theta - \\ 3ik_h L \cos^2\theta + ik_h L \end{array} \right] \right) \quad [6]$$

where $$k_h = \sqrt{\omega^2 \mu \left(\varepsilon_h - \frac{i\sigma_h}{\omega}\right)}$$

$$k_v = \sqrt{\omega^2 \mu \left(\varepsilon_v - \frac{i\sigma_v}{\omega}\right)}$$

$$\beta = \sqrt{\cos^2\theta + \left(\frac{k_v}{k_h}\right)^2 \sin^2\theta}$$

$k_h$=the complex wave number in the horizontal direction
$k_v$=the complex wave number in the vertical direction
$\omega$=the angular frequency (in radians/second) of the transmitter coil=$2\pi f$
f=the frequency of the transmitter coil (in Hertz)
$\mu$=the magnetic permeability of the formation (assume $\mu = \mu_{air}$)
$\sigma_h$=the horizontal conductivity of the formation
$\sigma_v$=the vertical conductivity of the formation
$\varepsilon_h$=the horizontal dielectric constant (assumed)
$\varepsilon_v$=the vertical dielectric constant (assumed)
L=the distance between the transmitter coil and the receiver coil, and
$i=\sqrt{-1}$
At the receiver antenna, the $H_z$ field (the field along the z-axis of the tool) is given by the equation $$H_z = (H_{hx} + H_{vx})\sin\theta + (H_{vz} + H_{hz})\cos\theta \quad [7a]$$

and the $H_x$ field (the field perpendicular to the z-axis of the tool and in the x-z plane of the formation coordinate system) is given by the equation $$H_x = (H_{hx} + H_{vx})\cos\theta - (H_{vz} + H_{hz})\sin\theta. \quad [7b]$$

For a receiver antenna tilted at an angle of $\xi_R$ and azimuth of $\alpha$ (see FIG. 5), the voltage induced in one receiver loop is $$V = i\omega A_r \mu (H_z \cos \xi_R + H_x \sin \xi_R \cos \alpha + H_y \sin \xi_R \sin \alpha) \quad [8]$$

where $A_r$ is the cross-sectional area of the receiver coil. From the foregoing equations, it can be shown that when the transmitter and receiver antennas are parallel, the induced receiver voltage is $$V = \frac{i\omega A_r \mu I_t A_t}{4\pi L^3}([2 - ik_h L]e^{ik_h L} - ik_h Le^{ik_h L\beta}) \quad [9]$$

Equation [9] shows that the induced voltage, V, depends on $k_h$ and $\beta$. In turn, $k_h$ depends on $\sigma_h$; and $\beta$ depends on $\sigma_h$, $\sigma_v$, and $\theta$. These relationships indicate that $\sigma_v$ and $\theta$ are dependent, and this dependency prevents convergence of a simultaneous solution for $\sigma_h$, $\sigma_v$, and $\theta$. To break this dependency and enable a solution for $\sigma_h$, $\sigma_v$, and $\theta$, it is desirable to have the transmitter antenna and receiver antenna tilted at different angles. Although the above formulation is for an coaxial transmitter with a tilted receiver, the theory of reciprocity provides that the same result also applies to a tilted transmitter with an untilted receiver. Indeed, both the transmitter and the receiver may be tilted, provided that the respective angles of tilt are not the same, i.e., $\xi_T \neq \xi_R$.

Figure 14:
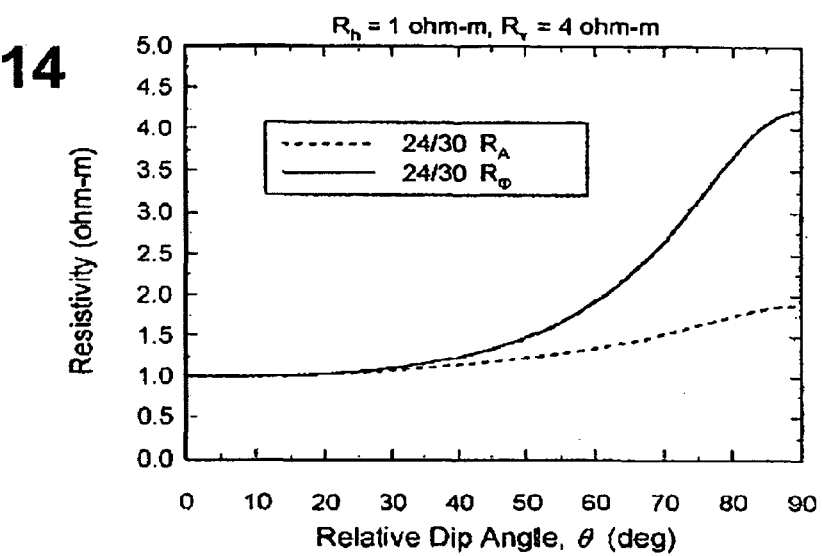
FIG. 14 is an illustrative graph comparing phase and attenuation resistivities for different relative dip angles.
Figure 15:
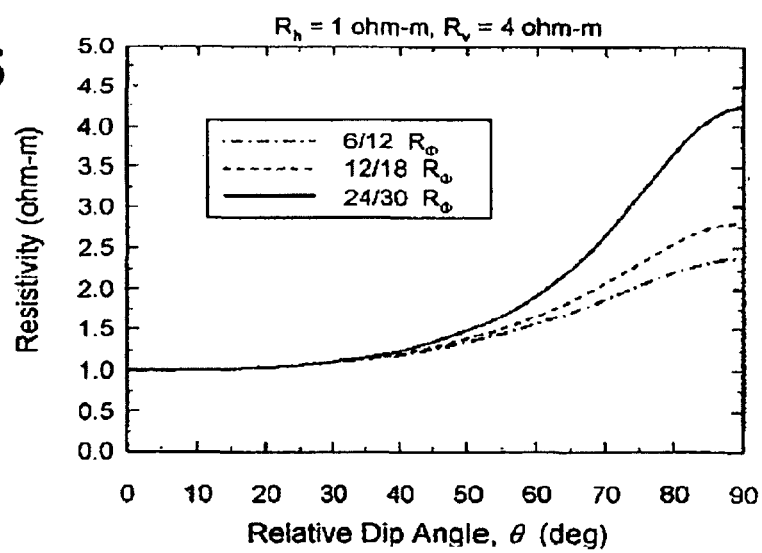
FIG. 15 is an illustrative graph comparing phase resistivity as a function of dip angle for different transmitter-receiver spacings.
Figure 16:
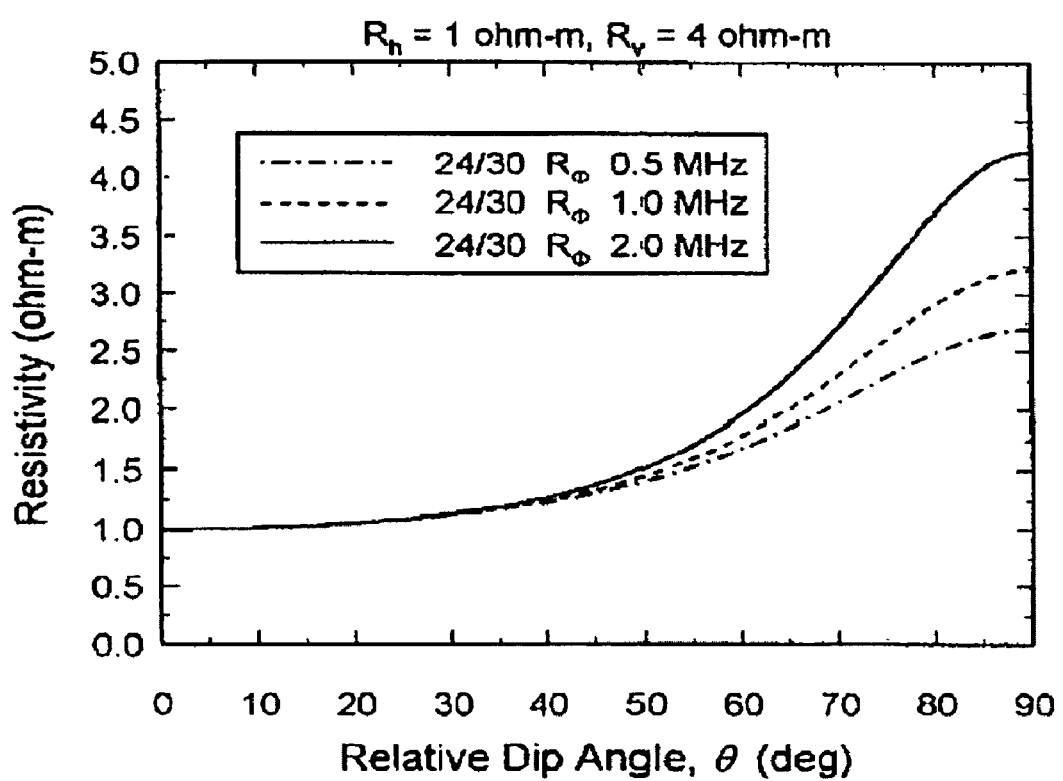
FIG. 16 is an illustrative graph comparing phase resistivity as a function of dip angle for different signal frequencies.

The sinusoidal-like variation in FIGS. 12-13 is evident. FIGS. 14-16 illustrate the dip dependence of the sinusoid peak values for a typical earth formation having a horizontal resistivity of 1 ohm-m and a vertical resistivity of 4 ohm-m. FIG. 14 depicts amplitude attenuation resistivity and phase shift resistivity as a function of relative dip angle using a single transmitter-receiver pair at a single frequency. FIG. 15 depicts phase shift resistivity as a function of relative dip angle using three transmitter-receiver pair spacings at a single frequency. FIG. 16 depicts phase shift resistivity as a function of relative dip angle using a single transmitter-receiver pair at three different frequencies.

Figure 17:
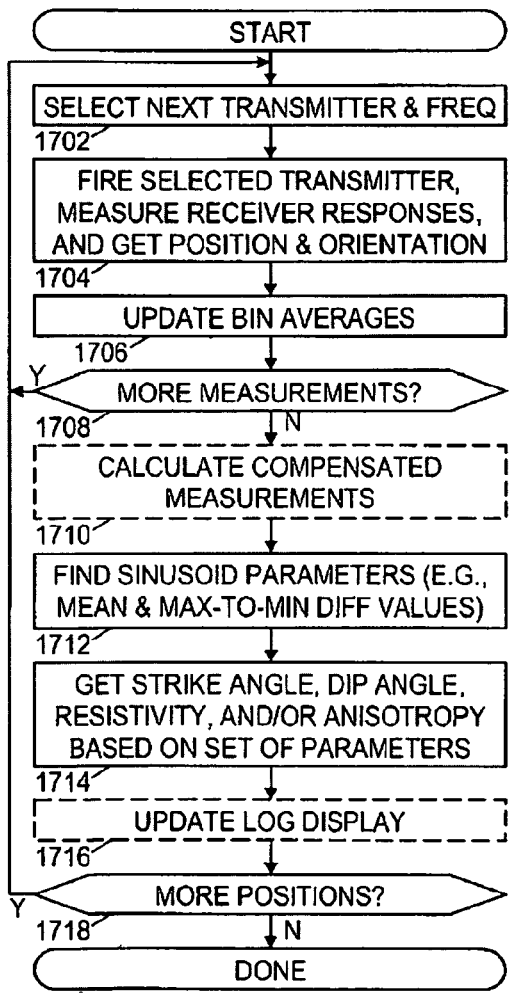
FIG. 17 is a flow diagram of an illustrative resistivity logging method.

FIG. 17 shows an illustrative resistivity logging process to determine horizontal resistivity, vertical resistivity, and relative dip angle as a function of position along the borehole. After the resistivity logging tool has been placed in a borehole and drilling commences, with accompanying rotation of the logging tool, the logging process begins in block 1702 with the selection of a transmitter antenna and a transmit frequency. As the process continues, the selection operation iterates through each transmit antenna and each transmit frequency that is suitable for that transmit antenna.

In block 1704, the logging tool drives the selected transmit antenna at the selected frequency, and measures the receiver responses. The logging tool further measures the tool position and orientation to be associated with the measured receiver responses. In various embodiments, the receiver responses may be absolute phase shift, absolute attenuation, differential phase shift, and/or differential attenuation. In block 1706, the position and orientation information is used to associate the measured receiver responses with an azimuthal bin. If multiple measurements are obtained for a given bin, the measurements may be combined, e.g., by averaging. In block 1708, a test is made to determine if there are more measurements to be made at this position in the borehole (e.g., a test to see if the measured tool position is still within a predetermined range). If so, blocks 1702-1708 are repeated.

In optional block 1710, the logging tool determines compensated phase and/or attenuation measurements as previously described with respect to FIG. 8. In block 1712, the logging tool determines a set of sinusoidal parameters to represent the measurements obtained at the current position in the borehole. Preferably, the set of characteristic parameters is indicative of the mean and the max-to-min difference, and may also indicate the position of the peak or valley of the sinusoid. In some embodiments, the parameters are determined from a parameterized sine function that fits the measured data with a minimum square error. The sinusoidal parameters may be communicated to the surface for the subsequent operations to be performed by surface computing facilities.

In block 1714, the characteristic parameters are inverted to determine one or more of the formation strike angle, the formation dip angle, the formation resistivity (horizontal or vertical), and the formation anisotropy. The determined formation measurements are stored in the form of a log, which may be optionally displayed and updated in block 1716. In block 1718, a test is made to determine whether the logging should continue (e.g., whether the drilling process is ongoing), and if so, blocks 1702-1718 are repeated.

The inversion process can take the form of a look-up table-based search with interpolation, but is preferably performed with a closed-form forward model of the tool responses that are expected in response to estimates of the formation dip, resistivity, and anisotropy. Beginning with random, arbitrary, or in some cases, predetermined, estimates of the formation dip, resistivity, and anisotropy, the inversion process repeatedly updates these estimates until the sinusoidal parameter values predicted by the forward model match the measured sinusoidal parameter values to within some predetermined threshold. The update routine may, for example, employ the Levenberg-Marquardt method discussed by Tianfei Zhu and Larry D. Brown, "Two-dimensional Velocity Inversion and Synthetic Seismogram Computation," Geophysics, vol. 52, no. 1, January 1987, p. 37-50.

In some embodiments, the measured characteristic parameter values are the mean and the max-to-min difference values of the differential phase shift measured as a function of azimuth at each of three or more transmit frequencies. In other embodiments, the characteristic parameter values are the mean and max-to-min difference values of the differential attenuation measured as a function of azimuth at three or more transmitter-to-receiver spacings. In yet other embodiments, both phase and attenuation information are measured and used as the basis of the inversion. Other characteristic parameter values are possible and may be used.

Figure 18:
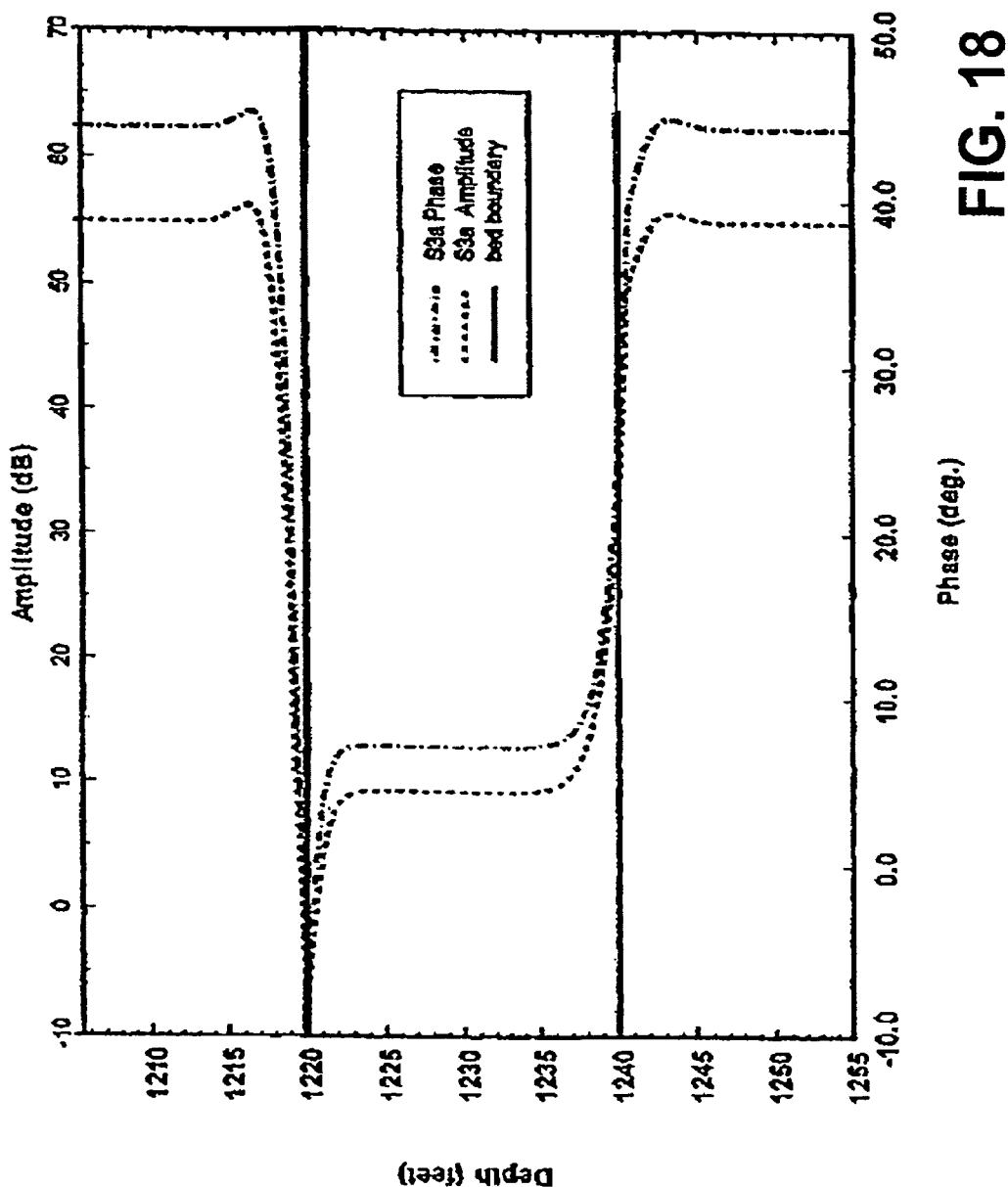
FIG. 18 is an illustrative graph of the tool response at one azimuthal orientation.
Figure 19:
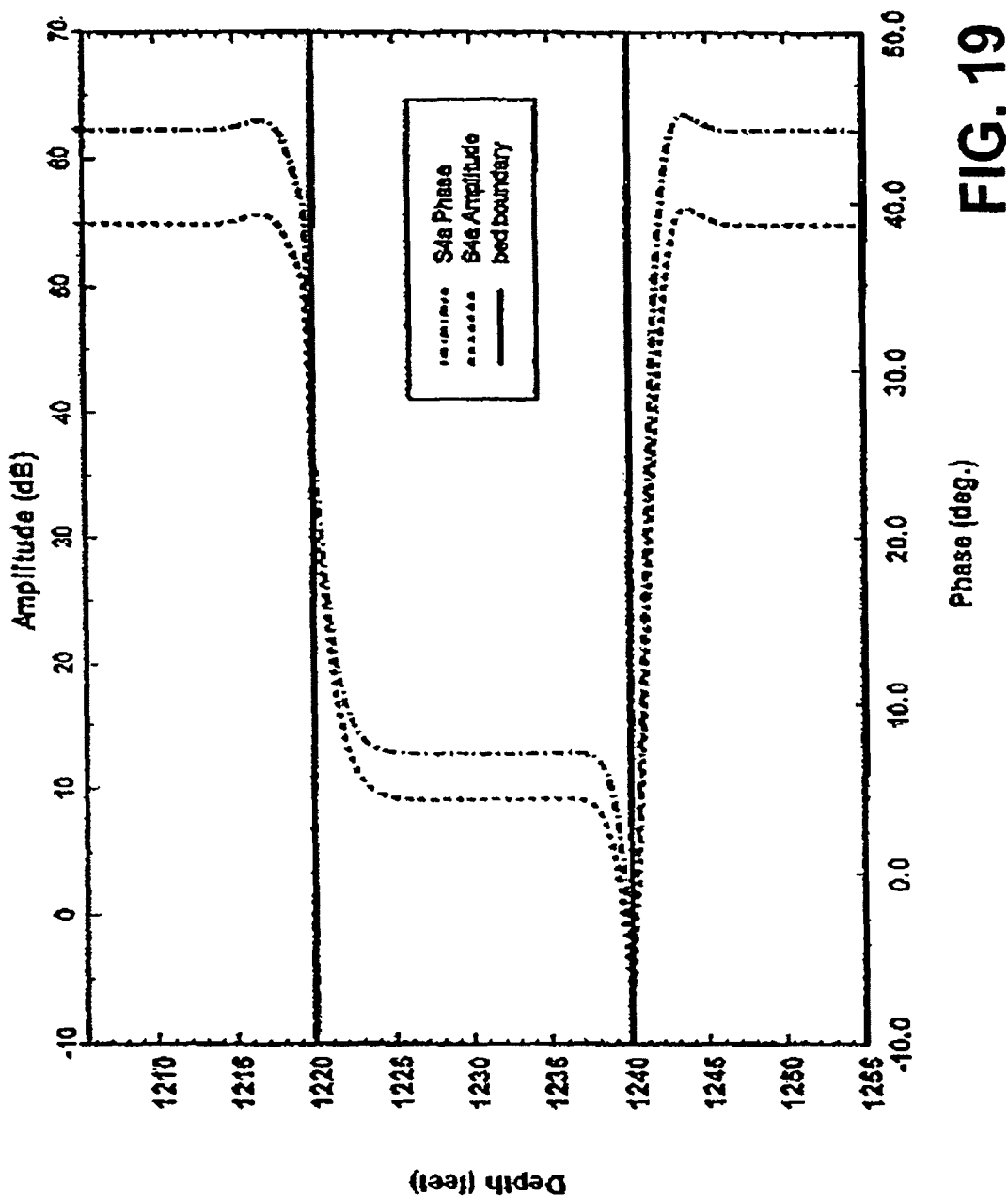
FIG. 19 is an illustrative graph of the tool response at an azimuthal orientation opposite that of FIG. 18.

Turning now to the geosteering aspect of this system, FIG. 18 shows the measured phase shift and attenuation at one azimuthal orientation of an illustrative resistivity logging tool having the antenna configuration shown in FIG. 7A, assuming a borehole passing through an isotropic, 20-ft thick 10 Ωm bed sandwiched between thick, isotropic 1 Ωm beds at a relative dip angle of 60°. The responses shown are for 2-MHz tools with 24/30 antenna spacings, and a receiver antenna tilt angle of 45°. (Further simulation details are available in Bittar, U.S. Pat. No. 7,138,803.) However, persons reasonably skilled in the art will recognize that other frequencies and antenna configurations can be used. The measured phase shift and attenuation at the opposite azimuthal orientation of the illustrative resistivity logging tool are shown in FIG. 19. When the differences of responses taken in opposite azimuthal directions are taken, they result in a differential response like that shown in FIG. 20. (A similar response can be found by subtracting from the response in one azimuthal direction the mean of the responses in all azimuthal directions.)

It is noted here that the tool response to a boundary between isotropic formations exhibits a sinusoidal response much like those shown in FIGS. 12 and 13. The maximum value of the response occurs in the azimuthal direction towards nearby boundaries with regions of higher conductivity and in the azimuthal direction away from nearby boundaries with regions of lower conductivity. Conversely, the minimum value of the response occurs in the azimuthal direction away from boundaries with regions of higher conductivity and in the azimuthal direction toward nearby boundaries with regions of lower conductivity. In both cases, the direction of the steering signal is consistent as the tool crosses a boundary.

In embodiments that condense the azimuthal resistivity measurement information into sinusoidal parameters such as a mean, a max-to-min difference, and peak orientation indicator, the max-to-min difference and the peak orientation indicator can be used as the steering signal. A max-to-mean difference and peak orientation indicator could be employed to similar effect. In some alternative embodiments, a ratio of max-to-min value is employed. The drilling operator may combine the steering signal information with tool position and orientation measurements and knowledge derived from test holes or seismic surveys to formulate directional steering decisions. The steering signals described herein are expected to be particularly effective at enabling a drilling operator to effectively detect and enter a payzone and at enabling the drilling operator to maintain a borehole course that maximizes the borehole interval in the payzone.

Although the foregoing specific details describe a preferred embodiment of this invention, persons reasonably skilled in the art of petroleum well drilling and logging will recognize that various changes may be made in the details of the method and apparatus of this invention without departing from the spirit and scope of the invention as defined in the appended claims. Therefore, it should be understood that this invention is not to be limited to the specific details shown and described herein.

What is claimed is:

1. A logging tool having a tool axis, the tool comprising:
    a first transmitter antenna to transmit an electromagnetic wave having a first frequency into a formation;
    a second transmitter antenna to transmit an electromagnetic wave having a second frequency into the formation;
    at least one receiver antenna to receive an electromagnetic wave from the formation, wherein at least one of the transmitter and receiver antennas is tilted with respect to the tool axis;
    a rotational angle sensor to determine an azimuthal angle of the logging tool;
    a processor coupled to the at least one receiver antenna and the rotational angle sensor to collect at least one formation measurement for at least three azimuthal angles at each of the first and second frequencies, and to determine based on said measurements at least one sinusoidal parameter characterizing the azimuthal variation of said at least one formation measurement at the first frequency and at least one additional sinusoidal parameter characterizing the azimuthal variation of said at least one formation measurement at the second frequency.

2. The logging tool of claim 1, wherein the parameter is indicative of a max-to-min difference of the formation measurement.

3. The logging tool of claim 1, wherein the at least one formation measurement comprises at least one of a complex voltage, an amplitude ratio, and a phase difference derived from the received electromagnetic wave.

4. The logging tool of claim 3, wherein the formation measurement is determined with reference to the electromagnetic wave from the transmitter antenna.

5. The logging tool of claim 3, wherein the formation measurement is determined with reference to the electromagnetic wave received by a second receiver antenna.

6. The logging tool of claim 1, wherein the at least one formation measurement is a resistivity component of the formation.

7. The logging tool of claim 6, wherein the at least one formation measurement is vertical resistivity.

8. The logging tool of claim 1, wherein the processor calculates vertical and horizontal resistivity of the formation.

9. The logging tool of claim 8, wherein the processor further calculates a relative dip of the formation.

10. The logging tool of claim 1, wherein the transmitter antenna is tilted at a first angle relative to the tool axis, the receiver antenna is tilted at a second angle relative to the tool axis, and a difference between the first and second angles is less than 90°.

11. The logging tool of claim 1, further comprising a second receiver antenna oriented parallel to the first receiver antenna to receive an electromagnetic wave from the formation.

12. The logging tool of claim 1, wherein the second transmitter antenna is oriented parallel to the first transmitter antenna.

13. A method that comprises:
    sending a first electromagnetic wave with a first frequency from a first transmitter antenna into a formation;
    receiving an electromagnetic wave having the first frequency from the formation with a receiver antenna, wherein at least one of the transmitter and receiver antennas is tilted with respect to a tool axis;
    sending a second electromagnetic wave having a second frequency from a second transmitter antenna into the formation, wherein the second frequency is different from the first frequency;
    receiving an electromagnetic wave having the second frequency from the formation with the receiver antenna;
    repeating said sending and receiving to collect at least one formation measurement at each of the first and second frequencies for at least three azimuthal angles;
    determining azimuthal variation of said at least one formation measurement at each of the first and second frequencies; and
    storing at least one sinusoidal parameter to characterize the azimuthal variation of the at least one formation measurement at the first frequency and at least one additional sinusoidal parameter to characterize the azimuthal variation of the at least one formation measurement at the second frequency.

14. The method of claim 13, wherein the formation measurement is at least one of phase shift, attenuation, and complex voltage derived from the received electromagnetic wave.

15. The method of claim 13, further comprising:
    displaying a resistivity log based at least in part on at least one of the sinusoidal parameters.

16. The method of claim 15, wherein the resistivity log represents at least one of a horizontal resistivity of the formation, a vertical resistivity of the formation, and an anisotropy coefficient of the formation.

17. The method of claim 16, further comprising determining a relative dip angle of the formation based at least in part on at least one of the sinusoidal parameters.

18. A tool for steering a downhole drilling apparatus, said tool comprising:
- a first transmitter antenna to transmit an electromagnetic wave having a first frequency into a formation;
- a second transmitter antenna to transmit an electromagnetic wave having a second frequency into the formation;
- at least one receiver antenna to receive a formation response caused by the electromagnetic waves, wherein at least one of the transmitter and receiver antennas is tilted relative to a tool axis;
- a rotational angle indicator to indicate a rotational angle; and
- a processor coupled to the receiver antenna and the rotational angle indicator to determine a formation measurement at each frequency for at least three rotational angles, and to determine for each frequency at least one parameter of an azimuthally-dependent sinusoid that best fits the formation measurement at that frequency.

19. The tool of claim 18, wherein the rotational angle indicator comprises at least one of a fluxgate, a magnetometer, an accelerometer, and a gyroscope.

20. The tool of claim 18, wherein the at least one parameter comprises an indicator of an azimuthal orientation of a peak of the periodical signal.

* * * * *